United States Patent
Jung et al.

(10) Patent No.: US 10,007,420 B2
(45) Date of Patent: Jun. 26, 2018

(54) METHOD FOR PROCESSING DATA AND ELECTRONIC DEVICE THEREOF

(71) Applicant: Samsung Electronics Co., Ltd., Suwon-si, Gyeonggi-do (KR)

(72) Inventors: In-Hyung Jung, Gumi-si (KR); Hyo-Jin Kim, Gyeongsan-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 208 days.

(21) Appl. No.: 14/484,830

(22) Filed: Sep. 12, 2014

(65) Prior Publication Data
US 2015/0082153 A1 Mar. 19, 2015

(30) Foreign Application Priority Data
Sep. 17, 2013 (KR) .................. 10-2013-0111840

(51) Int. Cl.
*G06F 17/00* (2006.01)
*G06F 3/0488* (2013.01)
*G06K 9/00* (2006.01)

(52) U.S. Cl.
CPC ..... *G06F 3/04883* (2013.01); *G06K 9/00402* (2013.01); *G06K 2009/00489* (2013.01); *G06K 2209/011* (2013.01)

(58) Field of Classification Search
CPC .. G06F 17/214; G06F 17/211; G06F 3/04883; G06K 9/04402
USPC .......................... 715/244, 269, 273, 263, 268
See application file for complete search history.

(56) References Cited

U.S. PATENT DOCUMENTS

| | | | | |
|---|---|---|---|---|
| 5,513,304 A | * | 4/1996 | Spitz | G06K 9/348 382/295 |
| 5,613,019 A | * | 3/1997 | Altman | G06F 3/04883 382/189 |
| 6,803,913 B1 | * | 10/2004 | Fushiki | G06T 11/203 345/467 |
| 7,266,769 B2 | * | 9/2007 | Thacker | G06F 3/0481 707/999.104 |
| 7,369,691 B2 | * | 5/2008 | Kondo | G06T 15/08 382/128 |
| 7,580,551 B1 | * | 8/2009 | Srihari | G06K 9/00161 340/5.52 |
| 7,584,424 B2 | * | 9/2009 | Hanechak | G06F 17/248 715/244 |
| 7,596,752 B2 | * | 9/2009 | Marks | G06F 17/24 715/255 |
| 8,012,019 B2 | * | 9/2011 | Escalera | G07F 17/3211 463/16 |

(Continued)

FOREIGN PATENT DOCUMENTS

KR 10-2011-0012217 A 2/2011

OTHER PUBLICATIONS

Chen et al., Analysis, Understanding and Representation of Chinese Newspaper with Complex Layout, IEEE 2000, pp. 590-593.*

(Continued)

*Primary Examiner* — Cong-Lac Huynh
(74) *Attorney, Agent, or Firm* — Jefferson IP Law, LLP

(57) ABSTRACT

A method of operating an electronic device is provided. The method includes detecting at least two object displayed contiguously, determining a line interval of the at least two objects, and reconfiguring an interval of the at least two objects based on the determined line interval.

20 Claims, 14 Drawing Sheets

(56) References Cited

U.S. PATENT DOCUMENTS

| | | | | |
|---|---|---|---|---|
| 8,239,763 B1* | 8/2012 | Fiesinger | G06F 17/211 | 715/269 |
| 8,407,589 B2* | 3/2013 | Ye | G06K 9/00409 | 715/262 |
| 8,522,140 B2* | 8/2013 | Hanechak | G06F 17/248 | 715/243 |
| 8,832,549 B2* | 9/2014 | Mansfield | G06F 17/211 | 382/173 |
| 9,275,022 B2* | 3/2016 | Pereira Filho | G06F 17/2247 | |
| 2004/0205606 A1* | 10/2004 | McCully | G06F 3/018 | 715/244 |
| 2005/0047682 A1* | 3/2005 | Stevens | H04N 1/00355 | 382/306 |
| 2007/0003142 A1* | 1/2007 | Simard | G06K 9/00416 | 382/187 |
| 2007/0061384 A1* | 3/2007 | Harrington | G06F 17/2288 | |
| 2010/0017706 A1* | 1/2010 | Wilczak, Jr. | G06F 17/211 | 715/244 |
| 2010/0114923 A1* | 5/2010 | McVady | G06F 17/30905 | 707/758 |
| 2010/0156919 A1* | 6/2010 | Bala | G06T 11/60 | 345/582 |
| 2010/0174985 A1* | 7/2010 | Levy | G06F 17/211 | 715/244 |
| 2010/0275112 A1* | 10/2010 | Bastos dos Santos | G06F 17/243 | 715/227 |
| 2011/0103690 A1* | 5/2011 | Napper | G06K 9/00409 | 382/188 |
| 2012/0257832 A1* | 10/2012 | Kobayashi | G06K 9/00436 | 382/182 |
| 2013/0238985 A1* | 9/2013 | Huang | G06F 17/212 | 715/244 |
| 2013/0283152 A1* | 10/2013 | Venkata | G06F 17/211 | 715/244 |
| 2014/0095992 A1* | 4/2014 | Ye | G06K 9/00409 | 715/268 |
| 2014/0325351 A1* | 10/2014 | Hirabayashi | G06K 9/222 | 715/273 |
| 2015/0278572 A1* | 10/2015 | Asukai | G06K 9/228 | 235/454 |
| 2015/0324338 A1* | 11/2015 | Levy | G06F 17/211 | 715/244 |
| 2016/0012286 A1* | 1/2016 | Sugiura | G06K 9/00409 | 382/187 |
| 2016/0132232 A1* | 5/2016 | Baba | G06K 9/00402 | 715/268 |
| 2016/0147723 A1* | 5/2016 | Lee | G06F 17/242 | 715/268 |
| 2016/0154579 A1* | 6/2016 | Lee | G06F 3/04883 | 382/189 |

OTHER PUBLICATIONS

Basu et al., Text Line Extraction from Multi-skewed Handwritten Documents, ScienDirect 2007, pp. 1825-1839.*
Pal et al., Multioriented and Curved Text Lines Extraction from Indian Documents, IEEE 2004, pp. 1676-1684.*
Kasar et al., Alignment of Curved Text Strings for Enhanced OCR Readability, Google Scholar 2013, pp. 1-9.*
Omar et al., Skew Detection and Correction Technique for Arabic Document Images based on Centre of Gravity, Google Scholar 2009, pp. 363-368.*
Mogharreban et al., A Combined Crisp and Fuzzy Approach for Handwriting Analysis, IEEE 2004, pp. 351-356.*
Fischer et al., Ground Truth Creation for Handwriting Recognition in Historical Documents, ACM 2010, pp. 3-10.*

\* cited by examiner

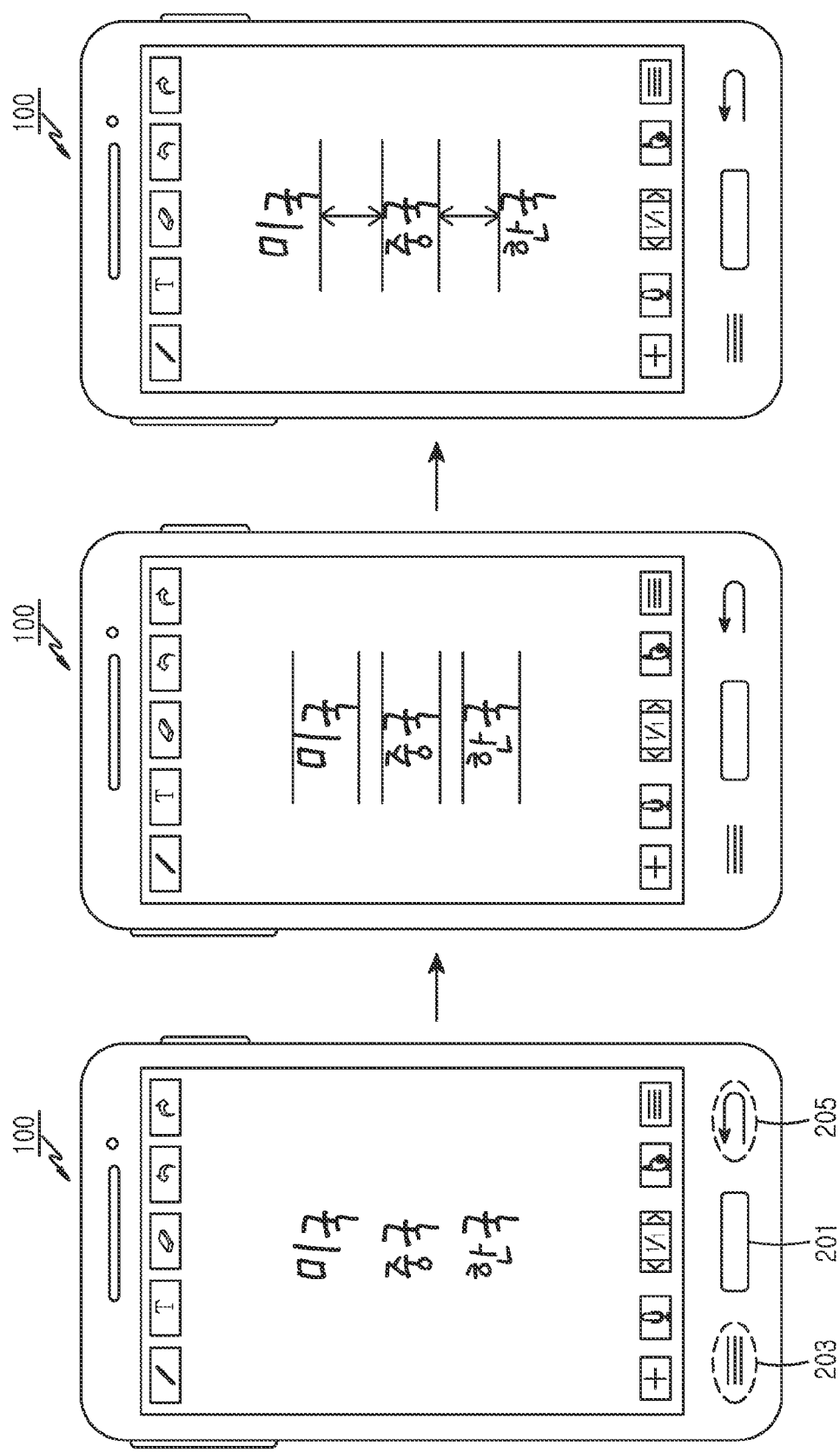

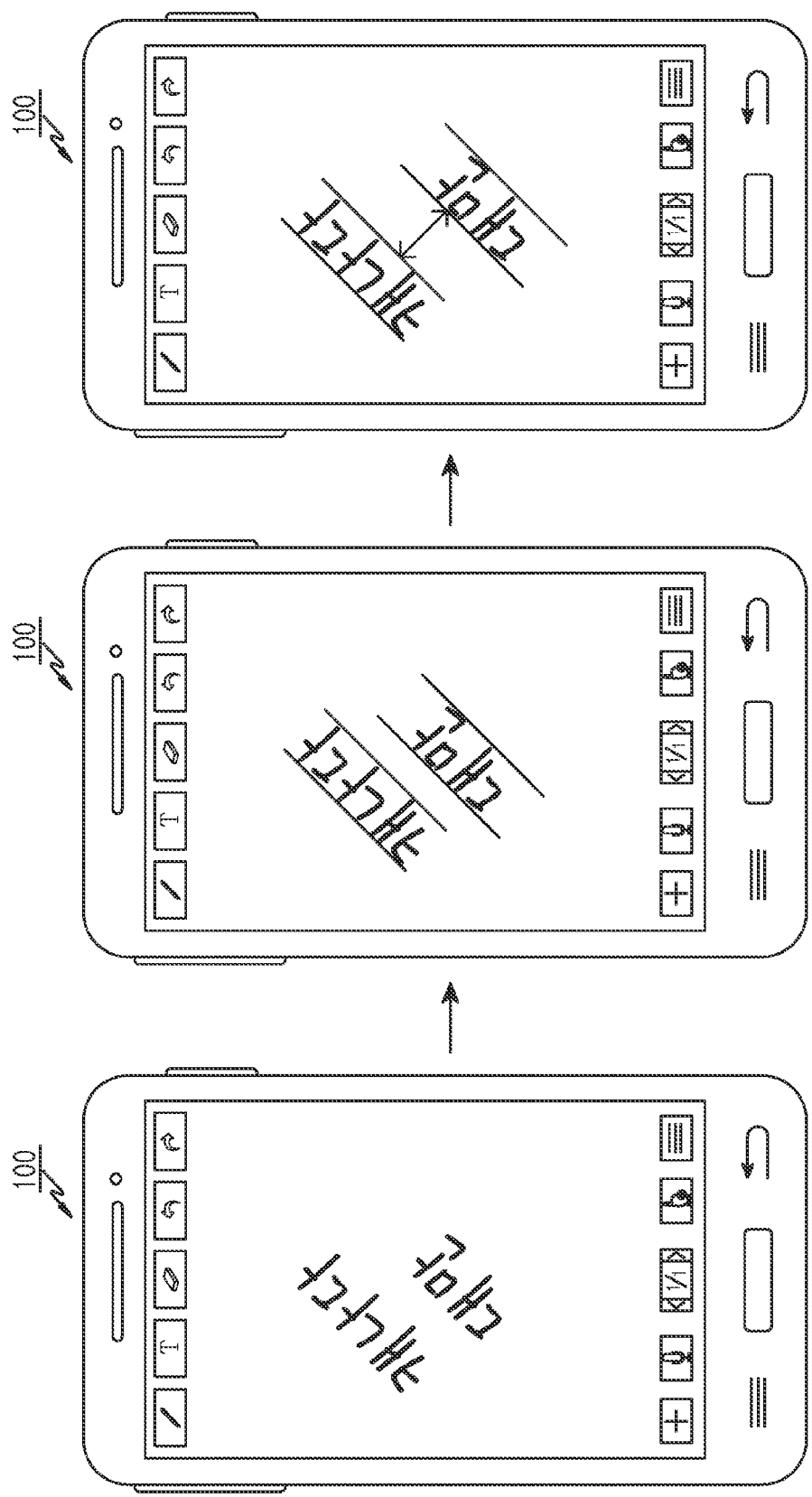

METHOD FOR PROCESSING DATA AND ELECTRONIC DEVICE THEREOF

CROSS-REFERENCE TO RELATED APPLICATION(S)

This application claims the benefit under 35 U.S.C. § 119(a) of a Korean patent application filed on Sep. 17, 2013 in the Korean Intellectual Property Office and assigned Serial number 10-2013-0111840, the entire disclosure of which is hereby incorporated by reference.

TECHNICAL FIELD

The present disclosure relates to a method of processing data when objects are contiguous to one another, and an electronic device thereof.

BACKGROUND

An electronic device is one of devices for outputting a data input, and generally uses a display device, i.e., a display unit, for performing an output operation and a touch screen device capable of simultaneously performing an input operation and the output operation. The electronic device can output to the display unit a variety of information provided by the electronic device. A gesture of touching or hovering displayed information or a specific area of a touch screen is input to the electronic device or to an input device provided independent of the display unit, so that a corresponding input function of the electronic is performed.

In a method of processing an object, the electronic device may provide a method of outputting the object to the display unit, converting the object into digital data, and storing the converted object into data of the electronic device.

In a method of storing data, the electronic device may provide a method capable of storing a variety of input information as image-format data, storing information corresponding to an input gesture, and storing data converted into a digital object corresponding to an object which is input in a handwriting manner with various handwritings.

The above information is presented as background information only to assist with an understanding of the present disclosure. No determination has been made, and no assertion is made, as to whether any of the above might be applicable as prior art with regard to the present disclosure.

SUMMARY

Aspects of the present disclosure are to address at least the above-mentioned problems and/or disadvantages and to provide at least the advantages described below. Accordingly, an aspect of the present disclosure is to provide a method of detecting objects corresponding to two or more baselines in a display unit of an electronic device, and the electronic device thereof.

Another aspect of the present disclosure is to provide a method of processing contiguous objects in an electronic device, and the electronic device thereof.

In accordance with an aspect of the present disclosure, a method of operating an electronic device is provided. The method includes detecting at least two objects displayed contiguously, determining a line interval of the at least two objects, and reconfiguring an interval of the at least two objects based on the determined line interval.

In accordance with an aspect of the present disclosure, a method of operating an electronic device is provided. The method includes detecting a first object located on a first line displayed by a display unit, detecting a second object located on a second line displayed by the display unit, detecting whether a line interval of the first object and the second object is less than a reference interval, and if the line interval is less than the reference interval, changing the line interval to a designated interval by reconfiguring a location of at least one of the first object and the second object.

In accordance with another aspect of the present disclosure, an electronic device is provided. The electronic device includes a display unit configured to display at least two object, a memory configured to store information on the at least two objects in the electronic device, and at least one processor configured to detect the at least two objects displayed contiguously, to detect a line interval of the detected at least two objects, and to reconfigure an interval of the at least two objects based on the determined line interval.

In accordance with another aspect of the present disclosure, an electronic device is provided. The electronic device includes a display unit configured to display a first object located on a first line and to display a second object located on a second line displayed by the display unit, and a processor configured to detect the first object and the second object displayed by the display unit, to determine whether a line interval between the first object and the second object is less than a reference interval, and to change the line interval to a designated interval by reconfiguring a location of at least one of the first object and the second object if the line interval is less than the reference interval.

Other aspects, advantages, and salient features of the disclosure will become apparent to those skilled in the art from the following detailed description, which, taken in conjunction with the annexed drawings, discloses various embodiments of the present disclosure.

BRIEF DESCRIPTION OF THE DRAWINGS

The above and other aspects, features, and advantages of certain embodiments of the present disclosure will be more apparent from the following description taken in conjunction with the accompanying drawings, in which:

FIGS. 2A, 2B, and 2C illustrate an operation of processing an input object in an electronic device according to an embodiment of the present disclosure;

FIGS. 4A, 4B, and 4C illustrates an operation of processing an input object in an electronic device according to an embodiment of the present disclosure;

Throughout the drawings, it should be noted that like reference numbers are used to depict the same or similar elements, features, and structures.

DETAILED DESCRIPTION

Figure 1:
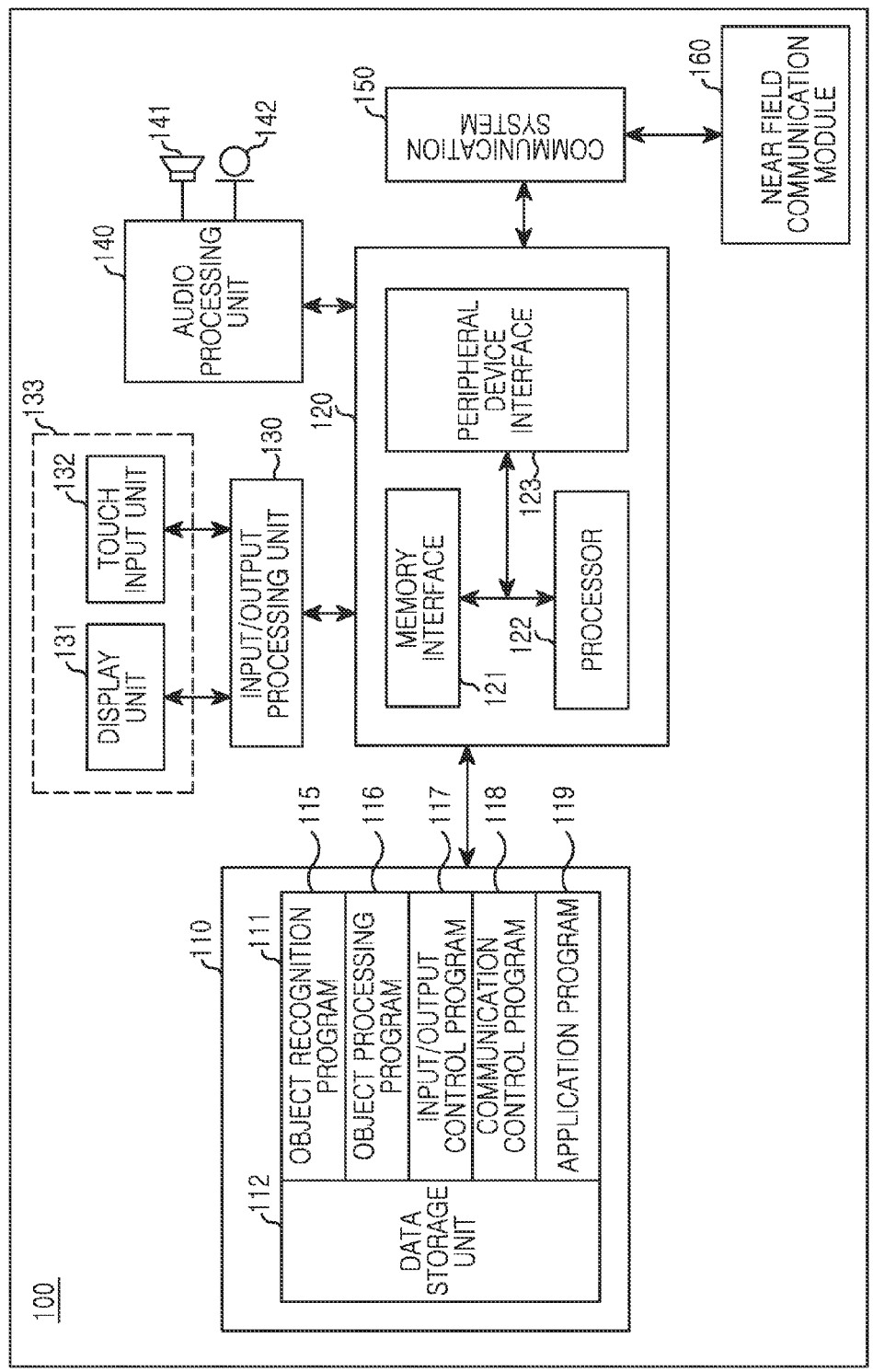
FIG. 1 is a block diagram of an electronic device according to an embodiment of the present disclosure.

The following description with reference to the accompanying drawings is provided to assist in a comprehensive understanding of various embodiments of the present disclosure as defined by the claims and their equivalents. It includes various specific details to assist in that understanding but these are to be regarded as merely exemplary. Accordingly, those of ordinary skill in the art will recognize that various changes and modifications of the various embodiments described herein can be made without departing from the scope and spirit of the present disclosure. In addition, descriptions of well-known functions and constructions may be omitted for clarity and conciseness.

The terms and words used in the following description and claims are not limited to the bibliographical meanings, but, are merely used by the inventor to enable a clear and consistent understanding of the present disclosure. Accordingly, it should be apparent to those skilled in the art that the following description of various embodiments of the present disclosure is provided for illustration purpose only and not for the purpose of limiting the present disclosure as defined by the appended claims and their equivalents.

It is to be understood that the singular forms "a," "an," and "the" include plural referents unless the context clearly dictates otherwise. Thus, for example, reference to "a component surface" includes reference to one or more of such surfaces.

According to embodiments of the present disclosure, when an electronic device 100 recognizes two or more objects determined as being located on multi lines, i.e., multiple lines, such as two or more lines, or as being contiguous to one another in a touch screen, if an interval between one line to another, hereinafter, referred to as a line interval, based on a baseline determined for each object does not satisfy a reference line interval that can be recognized by the electronic device 100, the objects may be recognized as different objects or an error message may be generated. Alternatively, even if the line interval satisfies the reference line interval that can be recognized by the electronic device 100, the line interval may be reconfigured so that a malfunction or an interference, which causes performance deterioration of the electronic device 100, does not occur when the object is recognized or detected. Hereinafter, a line interval or an interval between objects which is used as a reference by which the object can be sensed, recognized, or detected in the electronic device 100 is not limited to a line interval or an interval between objects which is used as a reference by which an input object or a displayed object may be erroneously sensed, recognized, or detected or can be converted into a digital object, and thus may be determined as a line interval or an interval between objects which is used as a reference by which performance of the electronic device 100 may deteriorate, for example, a designated processing time is over, when the electronic device 100 performs an operation of sensing, recognizing, or detecting the input object or the displayed object or of converting the object into a digital object.

Herein, the two or more objects determined as being located on the multi lines or as being contiguous to one another may be objects which are determined as objects which are not input on one line or a baseline by referring to a stroke of an input object. Alternatively, a baseline determined for one object may be used as a reference for indicating one or more different objects to which the same baseline cannot be applied. In the following description, the electronic device may display an object to a touch screen. However, it is not limited that one or more objects are displayed to the touch screen. Thus, it is apparent that the objects are also displayed to one or more of display devices, i.e., a display unit not including a touch screen and a touch input unit, included in the electronic device.

The following description with reference to the accompanying drawings. In the following description, well-known functions or constructions are not described in detail since they would obscure the present disclosure in unnecessary detail. Also, the terms used herein are defined according to the functions of the present disclosure. Thus, the terms may vary depending on user's or operator's intension and usage. That is, the terms used herein must be understood based on the descriptions made herein.

In the description of embodiments of the present disclosure, an electronic device may be described by assuming a touch screen capable of performing an input operation based on an input unit and a display operation based on a display unit in one physical screen. Although the display unit and the input unit are separately illustrated in the structure of the device in the present disclosure, it is also possible that the display unit includes the input unit or that the input unit is represented by the display unit.

The present disclosure is not limited only to the electronic device including the touch screen. Rather, the present disclosure may also apply to a case where the display unit and the input unit are physically separated or apply to various electronic devices including only one of the display unit and the input unit. Hereinafter, in various embodiments, the device having the touch screen may be an electronic device including a display unit, wherein the display unit is a touch screen including a touch input unit and a display unit, a display unit not including a touch input unit, a display unit including an input unit, etc.

In the following descriptions, the electronic device 100 may include a mobile communication terminal, a Personal Digital Assistant (PDA), a Personal Computer (PC), a laptop, a smart phone, a smart TeleVision (TV), a netbook, a Mobile Internet Device (MID), a Ultra Mobile Personal Computer (UMPC), a tablet PC, a mobile pad, a media player, a handheld computer, a navigation, a smart watch, a Head-Mounted Display (HMD), a Motion Picture Experts Group Layer 3 (MP3) player, etc.

When a component is mentioned as being "connected" to or "accessing" another component, this may mean that it is directly connected to or accessing the other component, but it is to be understood that there are no intervening components present. On the other hand, when a component is mentioned as being "directly connected" to or "directly accessing" another component, it is to be understood that there are no intervening components present.

FIG. 1 is a block diagram of an electronic device according to an embodiment of the present disclosure.

Referring to FIG. 1, the electronic device 100 includes a memory 110 and a processor unit 120. They electronic device 100 may further include an input/output processor 130, a touch screen 133 including a display unit 131 and a touch input unit 132, an audio processing unit 140, a communication system 150, a short-range wireless communication module 160, and may include other devices, elements and units that are not shown.

The memory 110 includes a program storage unit 111 for storing a program for controlling an operation of the electronic device 100 and a data storage unit 112 for storing data generated during the program is executed. Data generated by the program can be stored by the operation of a processor 122. According to one embodiment, the data storage unit 112 may predetermine operation information for controlling a function of the electronic device 100 and thus may configure and store a database in a table or list form.

The program storage unit 111 may include an object recognition program 115, an object processing program 116, an input/output control program 117, a communication control program 118, and at least one application program 119. Programs included in the program storage unit 111 may consist of a group of instructions and thus may be expressed in an instruction set. The application program 119 may include a software component for at least one application installed in the memory 110 of the electronic device 100.

The object recognition program 115 may be at least one of a program for converting an input object to a digital object, a module for converting an input object into a digital object, and a program for implementing all or some parts of an object recognition system for detecting an object from image data and converting it into a digital text. According to one embodiment, the digital object may be acquired from a handwritten input object by using a method of operating an Optical Character Recognition (OCR) reader. The object recognition system may include an object recognition program capable of detecting an object, e.g., an image or one or more character strings, including data of the electronic device 100 to acquire a corresponding digital object, an object recognition module consisting of one or more programs, an object recognition engine, a device, e.g., a module-type device, capable of performing the aforementioned method, etc.

The object recognition program 115 may sense or detect an object which is input in a handwriting manner to the touch screen 133 or the touch input unit 132, may sense or detect an object such as a normal image, handwritten image, normal text image, handwritten text image, etc., displayed to the display unit 131, may convert the sensed or detected object into data of a pre-set form, and may store the converted data.

When recognizing the object displayed by the display unit 131 or the touch screen 133, the object recognition program 115 may sense a spelling or stroke constituting the object, and may determine a form of the object displayed through the sensed stroke.

The object recognition program 115 may be included in the electronic device 100 as an independent program, or may be included as a part of another program, e.g., a part of the object processing program 116. Alternatively, the object recognition program 115 may be included in a plug-in type that can be coupled or connected to another program, or may be included as a program module connected to one or more other programs.

The object processing program 116 may provide control to sense a stroke of a spelling which is input on either one line or two or more lines or which constitutes two or more objects determined to be contiguous to one another. By sensing the stroke, the object processing program 116 may provide control to determine a state in which the spelling is located on a coordinate determined in the touch screen 133.

The object processing program 116 may provide control to determine a rectangular grid capable of indicating a state of the spelling by using one or more coordinates marked to the object which is input to the electronic device 100. The object processing program 116 may determine one or more baselines of an object which is input through a rectangular grid marked to one or more spellings, and may determine a line interval of objects which are input on several lines by using the baseline.

The object processing program 116 may determine that objects which are input to the electronic device are input on several lines, or two or more lines, in a contiguous manner. In an embodiment, the electronic device 100 may provide one or more coordinates or one or more virtual lines based on the coordinate to the touch screen 133, and may determine one or more baselines by referring to a virtual line on which the input object is located. It may be determined as an object which is input or displayed in another line if the electronic device 100 cannot apply the same baseline to each displayed object.

The object processing program 116 may determine an inclined state of the input object, may configure a new coordinate by referring to the inclination of the input object, and may provide control to determine one or more baselines for the object based on the newly determined coordinate. The input/output control program 117 may perform a process of determining a line interval with respect to another object by referring to the determined baseline, and may reconfigure the determined line interval. When reconfiguring the line interval, the electronic device 100 may move a display area or a location of objects by which the baseline is determined, in accordance with the reconfigured baseline. The electronic device 100 may display the object by referring to the reconfigured baseline.

The object processing program 116 may input information of objects moved by referring to the reconfigured baseline to an object recognition system which converts objects, which are included in data of the electronic device 100, into digital objects, similarly to the object recognition program 115. The electronic device 100 may transmit the information to the object processing program 115 included therein and also to an object recognition system connected to the electronic device, an object recognition system of an external electronic device connected through network communication, or an object recognition system of a server device.

An object processed by the object processing program 116 may be represented with a character string including one or more of elements, e.g., a spelling, a word, a symbol, a number, a geometric design, a geometric pattern, input to the touch screen 133, and may include a picture, photo, etc., including at least one of the aforementioned elements.

The object processing program 116 may be included in the electronic device 100 as an independent program, or may be included as a part of another program, e.g., a part of the object recognition program 115. Alternatively, the object recognition program 115 may be included in a plug-in type that can be coupled or connected to another program, or may be included as a program module connected to one or more other programs.

The input/output processing program 117 may perform a process of inputting an internal and/or external sound of the electronic device 100 via the media processing program 116 in a media data recording procedure. The input/output processing program 117 may store information on a gesture which is input to the touch screen 133 of the electronic device 100, or may store the gesture which is input to the touch screen 133 as at least one image data based on a time sequence or may store information on the gesture as digital data.

The communication control program 118 may include at least one software component for controlling communication with at least one different electronic device by using the communication system 150 or the short-range wireless communication module 160. According to an embodiment, the communication control program 118 may search for a different electronic device for a communication connection. If the different electronic device for the communication connection is found, the communication control program 118 may establish the connection with the different electronic device. Thereafter, the communication control program 118 may provide control to transmit and receive data, e.g., packet data, with respect to the different electronic device via the communication system 150 by performing a performance discovery and session establishment process with respect to the connected different electronic device.

The memory 110 included in the electronic device 100 may consist of one or more units. According to an embodiment, based on a usage, the memory 110 may function only as the program storage unit 111, may function only as the data storage unit 112, or may function as both of the two. According to a feature of the electronic device, a physical area inside the memory 110 may not be clearly divided.

The processor unit 120 may include a memory interface 121, at least one of the processor 122, and a peripheral device interface 123. Herein, the memory interface 121, the processor, 122, and peripheral device interface 123 included in the processor unit 120 may be integrated in at least one circuit or may be implemented as separate components.

The memory interface 121 may control an access to the memory 110 of a component such as the processor 122 or the peripheral device interface 123.

The peripheral device interface 123 may control a connection of the processor 122 and the memory interface 121 with respect to an input/output peripheral device of the electronic device 100.

The processor 122 may control the electronic device 100 to provide various multimedia services by using at least one software program, may control the display unit 131 to perform a display operation to confirm a User Interface (UI) operation of the electronic device via the input/output processor 130, and may control the touch input unit 132 to provide a service for receiving an instruction input from an external device of the electronic device 100. The processor 122 may execute at least one program stored in the memory 110 to provide a service corresponding to the program.

The input/output processor 130 may provide an interface between the peripheral device interface 123 and the input/output unit 133 such as the display unit 131 and the touch input unit 132.

The display unit 131 may constitute a UI operation by receiving state information of the electronic device 100, an object which is input from the external device, a moving image, or a still image from the processor unit 120 and may display it under the control of an input/output controller 130.

The touch input unit 132 may provide input data generated by a user's selection to the processor unit 120 via the input/output processor 130. According to an embodiment, the touch input unit 132 may consist of only a control button to receive data for the control from the external device of the electronic device 100, or may consist of a keypad.

According to an embodiment, the touch input unit 132 may be included in the display unit 131, which may be a touch screen in which an input and an output can be generated simultaneously. In this case, the touch input unit 132 used in the touch screen may use one or more of a capacitive type, a resistance and/or pressure sensitive type, an infrared type, an electro inductive type, and an ultrasonic type.

According to an embodiment, in addition to an input mechanism in which the touch screen 133 is directly touched, an input mechanism of the touch input unit 132 may be an input mechanism of inputting an instruction when an input object is located within a specific distance from the touch screen 133. Terms such as a hovering or floating touch, an indirect touch, a proximity touch, a non-contact input, etc., may be used.

The touch screen 133 is a device in which the touch input unit 132 is physically coupled on the display unit 131, and may be capable of inputting an instruction by receiving a touch on a screen configuration displayed in the display unit 131 in the operation of the electronic device 100. The touch screen 133 may perform both of a role of the display unit 131 for displaying the UI operation of the electronic device 100 and a role of the touch input unit 132 for inputting an external instruction to the electronic device 100. Therefore, in the following description, the touch screen 133 may be configured by including the display unit 131 and the touch input unit 132. In the present disclosure, the touch screen 133 consisting of a complex touch panel in which a touch panel and a pen touch panel are implemented together may be illustrated and the present disclosure may be described on the basis thereof. The touch screen 133 of the electronic device 100 is not limited to a touch screen consisting of the complex touch panel, but may also be applied to a touch screen to which a pen touch panel supporting only a pen touch is applied.

The audio processing unit 140 may provide an audio interface between a user and the electronic device 100 via a speaker 141 and a microphone 142.

The communication system 150 performs a communication function. The communication system 150 may perform communication with a different electronic device by using one or more of mobile communication, wired communication, and satellite communication, performed by a base station, and may perform the short-range wireless communication by being connected to the short-range wireless communication module 160.

According to an embodiment, the short-range wireless communication module 160 may perform communication with a different electronic device by using at least any one of NFC, infrared communication, Bluetooth communication, Bluetooth Low Energy (BLE) communication, WiFi communication, ZigBee communication, Ultra Wide-Band (UWB) communication, etc., wireless Local Area Network (LAN) communication, wired communication, or any other similar and/or suitable wired and/or wireless communication system. According to an embodiment, although the communication system 150 and the short-range wireless communication module 160 are described in a distinctive manner, the communication system 150 and the short-range wireless communication module 160 may perform communication in one communication system module. In the description of various embodiments of the present disclosure, an infrared communication module (not shown) and the short-range wireless communication module 160 may be described in a distinctive manner.

Although not shown, one or more programs and/or one or more components of the electronic device 100 may perform an operation by using one or more control modules (not shown) controlled by the processor 122.

In the description of an embodiment of the present disclosure, a display to the electronic device 100 or an output to the electronic device 100 may be a term for indicating a display mechanism for a moving image, a still image, or a UI operation via the touch screen 133 of the electronic device 100 or an audio output mechanism for an alarm sound or a voice via the speaker 141. Likewise, the term 'display' or 'output' may also be used in the same meaning in the following description, or if each term needs to be distinguished, it may be separately described.

FIGS. 2A, 2B, and 2C illustrate an operation of processing an input object in an electronic device according to an embodiment of the present disclosure.

Referring to FIGS. 2A, 2B, and 2C, the electronic device 100 may input objects of two or more lines via the touch screen 133. Herein, the object implies a shape or character string that can be displayed by being recorded into a text, a symbol, a number, a pattern, etc. According to an embodiment, the object may include a language of each country, and may include a geometric design, a symbol, a sign, and a number. In addition, the object may include a programming language used in the electronic device 100. According to an embodiment, the object may consist of one or more words, and the word may consist of a spelling. According to an embodiment, for example, the spelling may be an English alphabet, and in case of a language in which a syllable is determined in combination of a consonant and a vowel, such as a Korean alphabet, may be expressed with the consonant and/or the vowel. According to an embodiment, in a case of the Koran alphabet, one syllable consisting of at least one consonant and at least one vowel can be expressed as a letter. In the description of the embodiments of the present disclosure, the spelling and the letter are not distinctively indicated in the Korean alphabet, and one syllable or letter consisting of one or more consonants and vowels may be expressed as the spelling. According to an embodiment, the spelling may be configured by using a stroke.

When confirming an input object, the electronic device 100 may confirm each of strokes constituting the object, and may sense an operation of inputting an object of a next line after an input of an object of one line is finished. The electronic device 100 may convert the sensed objects, which are input in a handwriting manner on two or more lines, into digital objects consisting of a digital text. In the operation of converting the objects which are input on the two or more lines into the digital objects, if a line interval of the objects, which are input on the two or more lines, is less than a line interval that can be detected by the electronic device 100 as being input on the two or more lines, then the electronic device 100 may output an error message since the object is incorrectly detected as a different language or a corresponding digital text cannot be determined. The electronic device 100 may detect the line interval of the objects which are input in the handwriting manner on the two or more lines, and if the detected interval between one line to another line does not satisfy a reference line interval by which the objects are determined as being input on the two or more lines, then the electronic device 100 may reconfigure the line interval of the input objects. The reference line interval, by which the objects are determined as being input on the two or more lines in the electronic device 100, may be a pre-set value or may be a pre-set range. Hereinafter, even if the reference line interval is set to the range, it may also be described as the 'line interval'.

Referring to FIG. 2A, the speaker 141 capable of outputting a sound may be included in an upper portion of the electronic device 100. A button 201, which is one of input units capable of inputting an instruction through a click, may be included in a lower portion of the electronic device 100. Touch buttons 203 and 205 capable of inputting an instruction through a touch at a fixed position may be included. The electronic device 100 may include the microphone 142 capable of inputting an external sound of the electronic device 100 at a position which is exposed externally to the electronic device 100 to receive the input sound. The electronic device 100 may include the display unit 131 or the touch screen 133 at a front portion. A UI operation of the electronic device 100 is displayed via the display unit 131 or the touch screen 133. The electronic device 100 may input an instruction by using an operation of touching the touch screen 133, or may perform a function or operation of the electronic device 100 in accordance with the input instruction. In an embodiment described hereinafter, the electronic device 100 includes the touch screen 133.

Although some of the speaker 141, microphone 142, the button 201 or the touch buttons 203 and 205, and touch screen 133 are not illustrated, the electronic device 100 may include the speaker 141, the button 201 or the touch buttons 203 and 205, and the touch screen 133 at the same or different positions described above.

The electronic device 100 may input objects of two or more lines in a handwriting manner via the touch screen 133. According to an embodiment, the electronic device 100 may input objects consisting of '미국', '중국', and '한국', each of which is input on one line, so that the input objects are input on a total of three lines. The electronic device 100 may acquire a digital object from a handwritten input object by using a program for converting an input object to a digital object, a module for converting an input object into a digital object, or a method such as an OCR reader for detecting an object from image data and converting it into a digital text. In the acquiring of the digital object, if a line interval of '미국' and '중국' does not satisfy a reference line interval by which the objects can be determined as objects constructed of different lines, the electronic device 100 may not be able to recognize the objects as different objects of two lines and thus may determine the objects as a different language other than a Korean alphabet, of if it is determined as the Korean alphabet, may output an error message since a corresponding digital object cannot be determined.

Referring to FIG. 2B, the electronic device 100 may sense each stroke when detecting objects which are input in a handwriting manner on two or more lines. The electronic device 100 may sense an operation in which a last stroke of one line is input and an input of a stroke starts at another line, and may determine that the objects of two or more lines are input. According to an embodiment, in the detecting of '미국' and '중국' which are input to the touch screen 133 across two lines, the electronic device 100 may sense an input of a stroke 'ㄱ' which is a final consonant, i.e., a final sound, of '국' in the object '미국', may sense an input of 'ㅈ' which is an initial consonant, i.e., an initial sound, of the object '중국' in a specific area in the touch screen 133 and confirmed as an area other than an area on the same line of '미', and may determine that the input objects '미국' and '중국' are input across two lines.

According to an embodiment, the electronic device 100 may determine a highest value and lowest value of a height of an object which is input on each line. According to an embodiment, the electronic device may determine a highest value and lowest value of a height of the input object '미국', and may determine a highest value and lowest value of a height of the object '중국' input on another line. The electronic device 100 may determine the lowest height value of '미국' and the highest height value of '중국' as a line interval of the objects '미국' and '중국' input on two lines, and may compare whether the determined line interval is a reference line interval capable of determining whether the objects input to the electronic device 100 are objects which are input on two lines.

According to an embodiment, the electronic device 100 may determine each baseline based on the determined highest height value and lowest height value of '미국', and may determine each baseline based on the determined highest height value and lowest height value of '중국'. The electronic device 100 may compare whether a line interval of a baseline determined based on the lowest height value of '미국' and a baseline determined based on the highest height value of '중국' is a reference line interval capable of determining whether the objects which are input to the electronic device 100 are objects which are input on two lines.

Referring to FIG. 2C, if the line interval determined by the objects input on two or more lines does not satisfy the reference line interval in the electronic device 100 according to the comparison result, the electronic device 100 may reconfigure the line interval determined by the objects.

According to an embodiment, the electronic device 100 may reconfigure the line interval determined by the objects if a line interval determined based on the comparison result of FIG. 2B does not satisfy the reference line interval in the electronic device 100. According to an embodiment, if the line interval determined between objects input to the electronic device 100 is less than the reference line interval, the electronic device 100 may reconfigure the determined line interval to be equal to or greater than the reference line interval.

According to an embodiment, the electronic device 100 may convert the detected object into a digital text, or likewise, may convert an object of which the determined line interval is reconfigured into a digital text. According to an embodiment, a process of converting an input object into a digital text in the electronic device 100 may perform an operation of determining a corresponding digital text from some of all parts of the object, such as a word, spelling, or stroke of the detected object, via a database stored in the memory 110 of the electronic device 100 or connected through network communication. The electronic device 100 may determine objects which are input on two lines in this process as objects which are input on one line or may incorrectly determine the number of lines of the objects which are input on two or more lines. If the object of which the number of lines is incorrectly determined is converted into a digital object, the electronic device 100 may output an error message indicating that a corresponding digital text or digital object cannot be determined. As described above, if the line interval of the objects, which are input on two or more lines, or the reconfigured line interval is determined by an incorrect number of lines in the process of converting into the digital text in the electronic device 100, the electronic device 100 may reconfigure a line interval between corresponding objects.

Figure 3A:
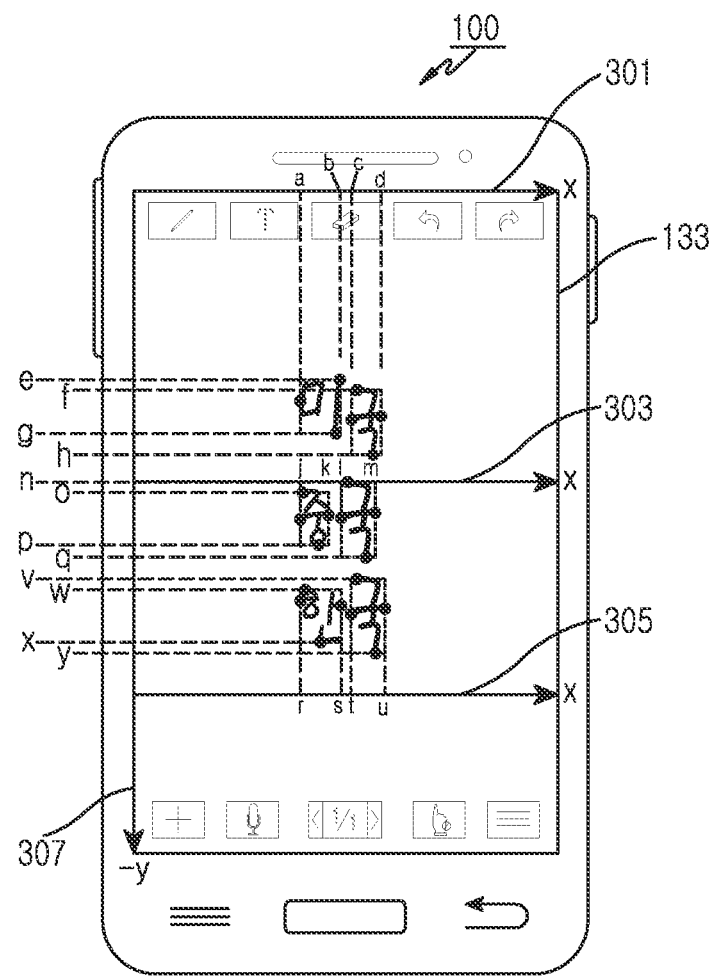
FIGS. 3A, 3B, and 3C illustrate an operation of reconfiguring a line interval in an electronic device according to an embodiment of the present disclosure.
Figure 3B:
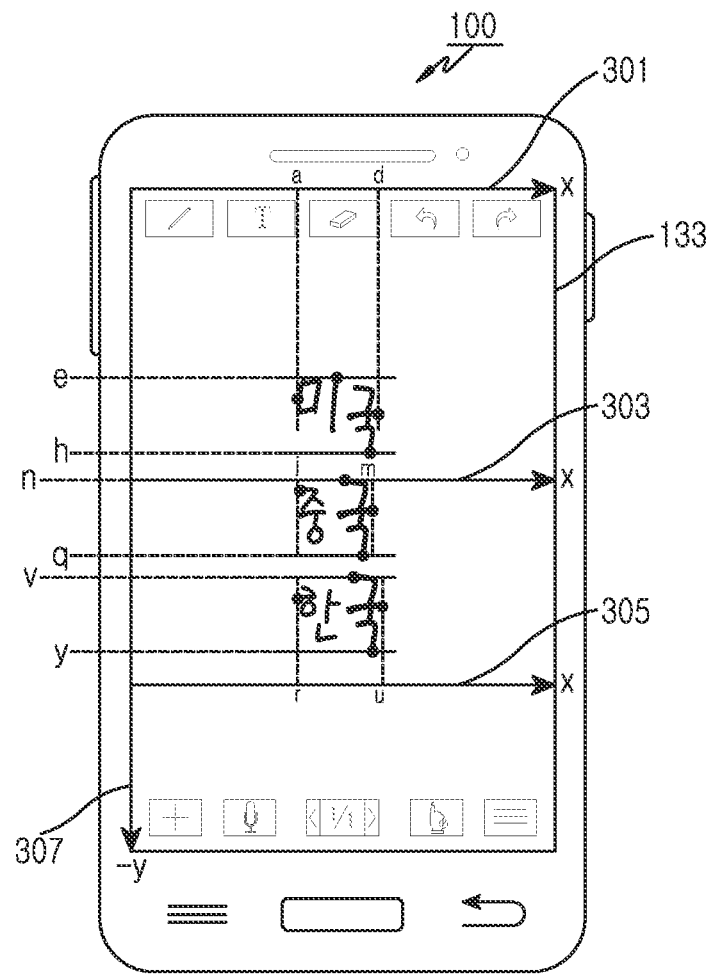
Figure 3C:
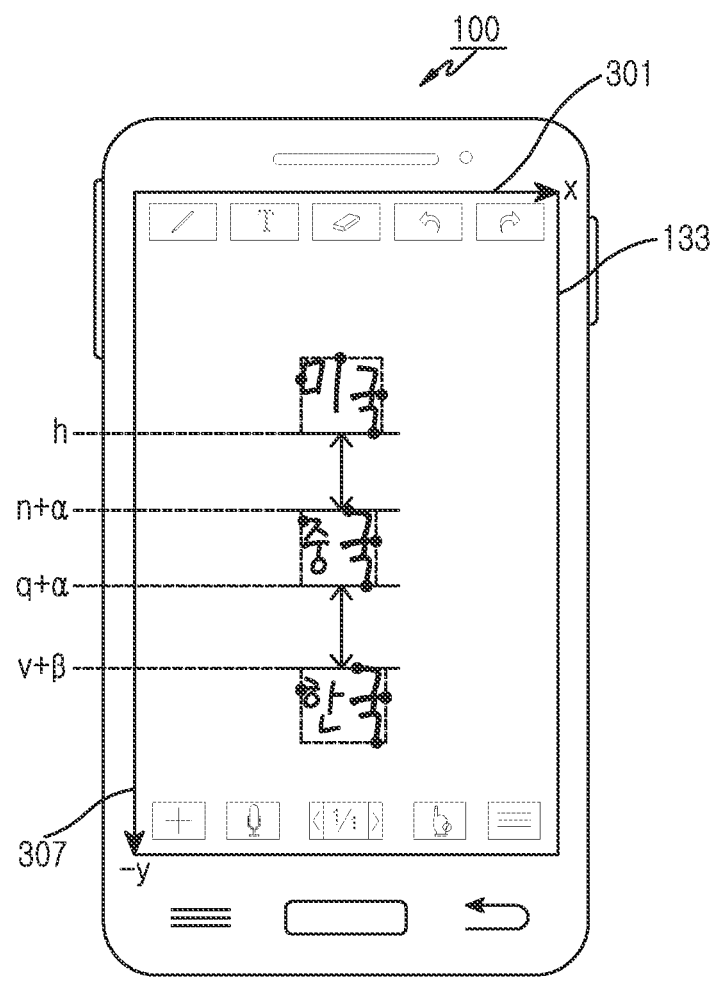

FIGS. 3A, 3B, and 3C illustrate an operation of reconfiguring a line interval in an electronic device according to an embodiment of the present disclosure.

Referring to FIG. 3A, the electronic device 100 may configure a virtual coordinate in the touch screen 133, and may acquire an input location of a gesture by using a touch or hovering mechanism based on a coordinate axis of the virtual coordinate. According to one an embodiment, the electronic device 100 may determine a virtual x-axis 301 and a virtual y-axis 307 which are not displayed in the touch screen 133. Another x-axis 303 or 305 illustrated in FIG. 3A is a virtual x-axis 303 or 305 added to clearly display a coordinate according to an embodiment. It is described hereinafter that an x-axis has a positive (+) value and a y-axis has a negative (−) value in the coordinate.

Hereinafter, an embodiment of the present disclosure will be described with reference to FIG. 3A.

Referring to FIG. 3A, the electronic device 100 may acquire a coordinate corresponding to objects which are input on two or more lines. According to an embodiment, the electronic device 100 may distinguish the input object by a word and a spelling.

The electronic device 100 may determine a highest value and lowest value of the x-axis direction and a highest value and lowest value of the y-axis direction in each word, each letter, or each spelling, constituting the word in the input object. According to an embodiment, in case of an object '미국' illustrated in FIG. 3A, a highest value and lowest value of the x-axis of '미' may be respectively determined to be 'b' and 'a', and a highest value and lowest value of the y-axis may be respectively determined to be 'e' and 'g'. Further, a highest value and lowest value of the x-axis of '국' may be respectively determined to be 'c' and 'd', and a highest value and lowest value of the y-axis may be respectively determined to be 'f' and 'h'.

Hereinafter, an embodiment of the present disclosure will be described with reference to FIG. 3B.

Referring to FIG. 3B, the electronic device 100 may determine a highest value or lowest value of a height, i.e., along the y-axis, of an object included in each line by using a coordinate acquired from objects which are input on two or more lines. According to an embodiment, the electronic device 100 may determine the input object '미국' as an object which is input on the same line, and may determine a highest value and lowest value of a height of the object '미국', which is input on the same line, to be 'e' and 'h', respectively. Likewise, the electronic device 100 may determine a highest value and lowest value of a height of the input object '중국' to be 'n' and 'q', respectively, and may determine a highest value and lowest value of a height of the input object '한국' to be 'v' and 'y', respectively.

The electronic device 100 may determine an interval between objects located on each line with respect to a highest height value or lowest height value of an object distinguished by each line. According to an embodiment, the electronic device 100 may determine a y-axis distance of the lowest height value 'h' of the input object '미국' and the highest height value 'n' of the input object '중국' to be a line interval of the input objects '미국' and '중국'. The electronic device 100 may compare the determined line interval with a reference line interval capable of determining an object which is input on another line, and may determine whether the line interval satisfies the reference line interval.

Likewise, the electronic device 100 may determine a y-axis distance of the lowest height value 'q' of the input object '중국' and the highest height value 'v' of the input object '한국' to be a line interval of the input objects '중국' and '한국'. The electronic device 100 may compare the determined line interval with a reference line interval capable of determining an object which is input on another line, and may determine whether the line interval satisfies the reference line interval.

According to an embodiment, in the determining of the reference line interval, the electronic device 100 may determine the line interval to be a pre-set value, or may determine the line interval based on an object which is input to the touch screen 133. According to an embodiment, in the determining of the reference line interval of the input objects '미국' and '중국', the electronic device 100 may determine the line interval based on the input objects '미국' and '중국'. The electronic device 100 may determine a height of the input object '미국'. According to an embodiment, the height of the object '미국' may be determined to be a difference between the highest height value 'e' and the lowest height value 'h'. According to an embodiment, a height of the object '중국' may be determined to be a difference between the highest height value 'n' and the lowest height value 'q'. The electronic device 100 may determine an average height of the determined '미국' and '중국', and may determine the reference line interval of '미국' and '중국' to be ⅓ of the average height of '미국' and '중국'. Likewise, the electronic device may determine the reference line interval of '중국' and '한국'.

According to an embodiment, in a method of comparing a line interval of input objects of two or more lines, the electronic device 100 may determine a baseline to a lowest height value of an object which is input on a line on which the existing object is input and a highest height value of an object which is input on another line, and may determine an interval between baselines to the line interval.

Hereinafter, an embodiment of the present disclosure will be described with reference to FIG. 3C.

According to an embodiment of the present disclosure, the electronic device 100 may reconfigure a line interval of input objects if the line interval of the objects, which are input on two or more lines, does not satisfy a reference line interval, and may display the input objects to the touch screen 133 based on the reconfigured line interval.

According to an embodiment, the electronic device 100 may determine a line interval of the input objects '미국' and '중국'. The electronic device 100 may determine whether the determined line interval satisfies the reference line interval. According to one embodiment, if the line interval of '미국' and '중국' is less than ⅓ of an average height of '미국' and '중국', i.e., a reference line interval determined by referring to FIG. 3B, the electronic device 100 may determine that the reference line interval is not satisfied. The electronic device 100 may reconfigure the line interval of '미국' and '중국' to be greater than ⅓0 of the average height of '미국' and '중국' and less than ⅔ of the average height of '미국' and '중국'. The electronic device 100 may determine an alpha value, which may also be referred to as α, such that the line interval of '미국' and '중국' is the reconfigured line interval, and may move the input object '중국' by the alpha value in a '-y-axis' direction. The electronic device 100 may display '미국' and '중국' to the screen 133 according to the reconfigured line interval.

According to an embodiment, if the input objects are moved based on the reconfigured line interval, the electronic device 100 may move the input object '미' and also the object '미국' of which a line interval is changed as the object '미국' is moved. According to an embodiment, if the input object '미국' is moved by the alpha value in a -y-axis direction, the electronic device 100 may also move the object '한국' by the alpha value in the -y-axis direction. If the line interval of the input object '미국' and the object '한국' does not satisfy the reference line interval, when a location of '국' is moved based on the reconfigured line interval, the electronic device 100 may move the object further by the alpha value in the -y-axis direction.

According to an embodiment, the electronic device 100 may determine a line interval of the input objects '미국' and '한국'. The electronic device 100 may determine whether the determined line interval satisfies the reference line interval. According to an embodiment, if the line interval of '미국' and '한국' is less than ⅓ of an average height of '미국' and '한국', i.e., a reference line interval determined by referring to FIG. 3B, the electronic device 100 may determine that the reference line interval is not satisfied. The electronic device 100 may reconfigure the line interval of '미국' and '한국' to be greater than ⅓ of the average height of '미국' and '한국' and less than ⅔ of the average height of '중국' and '한국'. The electronic device 100 may determine a beta value, which may also be referred to as β, such that the line interval of '미국' and '한국' is the reconfigured line interval, and may move the input object '한국' by the beta value in a -y-axis direction. The electronic device 100 may display '미국' and '한국' to the touch screen 133 according to the reconfigured line interval. According to an embodiment, the beta value may be a value which additionally includes the alpha value if the input objects '미국' and '한국' are not yet moved by the alpha value by the electronic device 100.

When performing an operation of changing the input object to a digital object, the electronic device may reconfigure the line interval as described above if the line interval of the input objects '미국' and '중국' or the line interval of '중국' and '한국' is less than a reference line interval recognized by the electronic device 100 as an object input on another line, and may change a location of the input object according to the reconfigured line interval. Further, according to embodiment, the electronic device 100 may use a reconfigured result as a reference when changing the input object to the digital object.

FIGS. 4A, 4B, and 4C illustrate an operation of processing an input object in an electronic device according to an embodiment of the present disclosure.

According to an embodiment, the electronic device 100 may input objects having two or more inclinations via the touch screen 133. When confirming the object that is inclined, the electronic device 100 may confirm each stroke constituting the object, and may sense an operation of inputting an object having the same or similar inclination in a next line after an input of an object on one line is finished in a state of having an inclination in the touch screen 133. The electronic device 100 may convert the sensed objects, which are input in a handwriting manner on two or more lines, into digital objects consisting of a digital text. In the operation of converting the objects which are input on the two or more lines into the digital objects, if a line interval of the objects, which are input on the two or more lines in a state of having an inclination is less than a line interval that can be detected by the electronic device 100 as being input on two or more lines, then the electronic device 100 may output an error message since the objects are incorrectly detected as a different language, for example, of a different country, or a corresponding digital text cannot be determined. The electronic device 100 may detect a line interval of the objects which are input in the handwriting manner on the two or more lines having an inclination, and if the detected interval between one line to another line does not satisfy a reference line interval by which the objects are determined as being input on the two or more lines, then the electronic device 100 may reconfigure a line interval of the input objects. The reference line interval by which the objects are determined as being input on the two or more lines in the electronic device 100 may be a pre-set value or may be a pre-set range. Hereinafter, even if the reference line interval is set to the range, it may also be described as the 'line interval'.

Referring to FIG. 4A, the electronic device 100 may input objects of two or more lines in an inclined state in a handwriting manner via the touch screen 133. According to an embodiment, the electronic device 100 may input objects consisting of '캐나다' and '대만', each of which is input on one line, that is, across two lines. The electronic device 100 may acquire a digital object from a handwritten input object by using at least one of a program for converting an input object to a digital object, a module for converting an input object into a digital object, and a method, such as an OCR reader, for detecting an object from image data and converting it into a digital text. In the acquiring of the digital object, if a line interval of '캐나다' and '대만' does not satisfy a reference line interval by which the objects can be determined as objects constructed of different lines, the electronic device 100 may not be able to recognize the objects as different objects of two lines and thus may determine the objects as a different language other than a Korean alphabet, or, if the objects are determined as the Korean alphabet, may output an error message since a corresponding digital object cannot be determined.

Referring to FIG. 4B, the electronic device 100 may sense each stroke when detecting objects which are input in a handwriting manner on two or more lines in an inclined state. The electronic device 100 may sense an operation in which a last stroke of one line is input and an input of a stroke starts at another line, and may determine that objects of two or more lines are input. According to an embodiment, in the detecting of '캐나다' and '대만', which are input to the touch screen 133 across two lines, the electronic device 100 may sense an input of a stroke 'ㅏ' which is a vowel of '다' in the object '캐나다', may sense an input of 'ㄷ' which is an initial consonant, i.e., an initial sound, of '대만', in a specific area in the touch screen 133 that is confirmed as and/or determined to be an area other than an area on the same line of '캐나다', and may determine that the input objects '캐나다' and '대만' are input across two lines.

According to an embodiment, the electronic device 100 may determine a highest value and lowest value of a height of an object which is input on each line. According to an embodiment, the electronic device 100 may determine a highest value and lowest value of a height of the input object '캐나다', and may determine a highest value and lowest value of a height of the object '대만' input on another line. The electronic device 100 may determine the lowest height value of '캐나다' and the highest height value of '대만' as a line interval of the objects '캐나다' and '대만' input on two lines, and may compare and/or determine whether the determined line interval is a reference line interval that may be used for determining whether the objects input to the electronic device 100 are objects which are input on two lines.

According to an embodiment, the electronic device 100 may determine each baseline based on the determined highest height value and lowest height value of '캐나다', and may determine each baseline based on the determined highest height value and lowest height value of '대만'. The electronic device 100 may compare and/or determine whether a line interval of a baseline determined based on the lowest height value of '캐나다' and a baseline determined based on the highest height value of '대만' is a reference line interval that may be used for determining whether the objects which are input to the electronic device 100 are objects which are input on two lines.

Referring to FIG. 4C, if the line interval determined by the objects which are input on two or more lines does not satisfy the reference line interval in the electronic device 100 according to the comparison result, the electronic device 100 may reconfigure a line interval determined by the objects.

According to an embodiment, the electronic device 100 may reconfigure the line interval determined by the objects if the line interval determined based on the comparison result of FIG. 4B does not satisfy the reference line interval in the electronic device 100. According to an embodiment, if the line interval determined between objects input to the electronic device 100 is less than the reference line interval, the electronic device 100 may reconfigure the determined line interval to be equal to or greater than the reference line interval.

According to an embodiment, the electronic device 100 may convert the detected object into a digital text, or likewise, may convert an object of which the determined line interval is reconfigured into a digital text. According to an embodiment, a process of converting an input object into a digital text in the electronic device 100 may perform an operation of determining a corresponding digital text from some of all parts of the object, such as a word, a spelling, or a stroke of the detected object via a database stored in the memory 110 of the electronic device 100 or connected through network communication. The electronic device 100 may determine the objects which are input on two lines in this process as objects which are input on one line or may incorrectly determine the number of lines of the objects which are input on two or more lines. If the object, of which the number of lines is incorrectly determined, is converted into a digital object, then the electronic device 100 may output an error message indicating that a corresponding digital text or digital object cannot be determined. As described above, if the line interval of the objects which are input on two or more lines, or if the reconfigured line interval is determined by an incorrect number of lines in the process of converting into the digital text in the electronic device 100, then the electronic device 100 may reconfigure a line interval between corresponding objects.

Figure 5A:
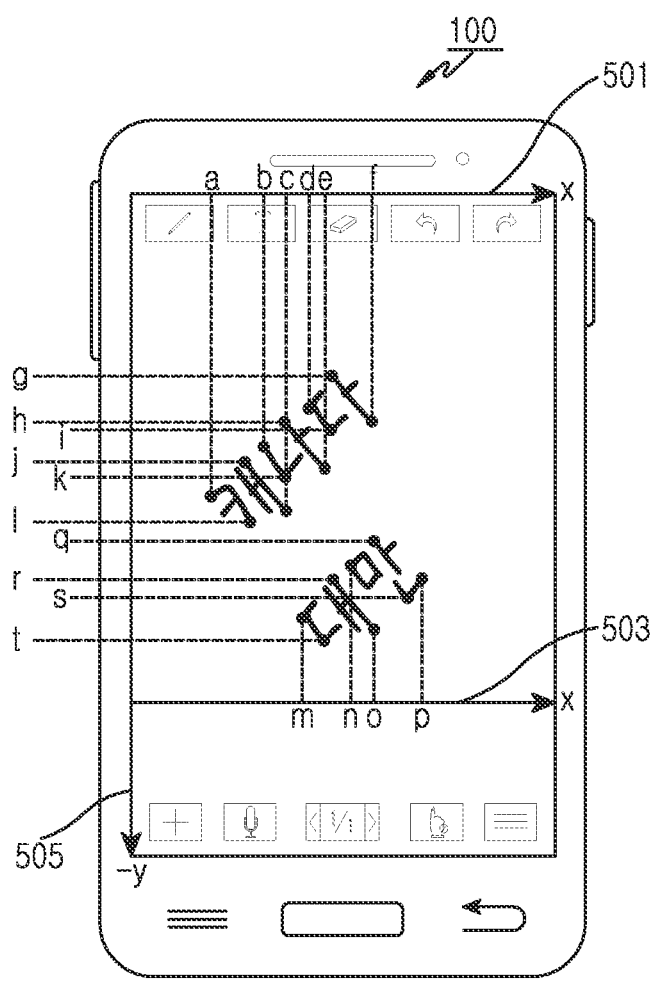
FIGS. 5A, 5B, and 5C illustrate an operation of reconfiguring a line interval in an electronic device according to an embodiment of the present disclosure.
Figure 5B:
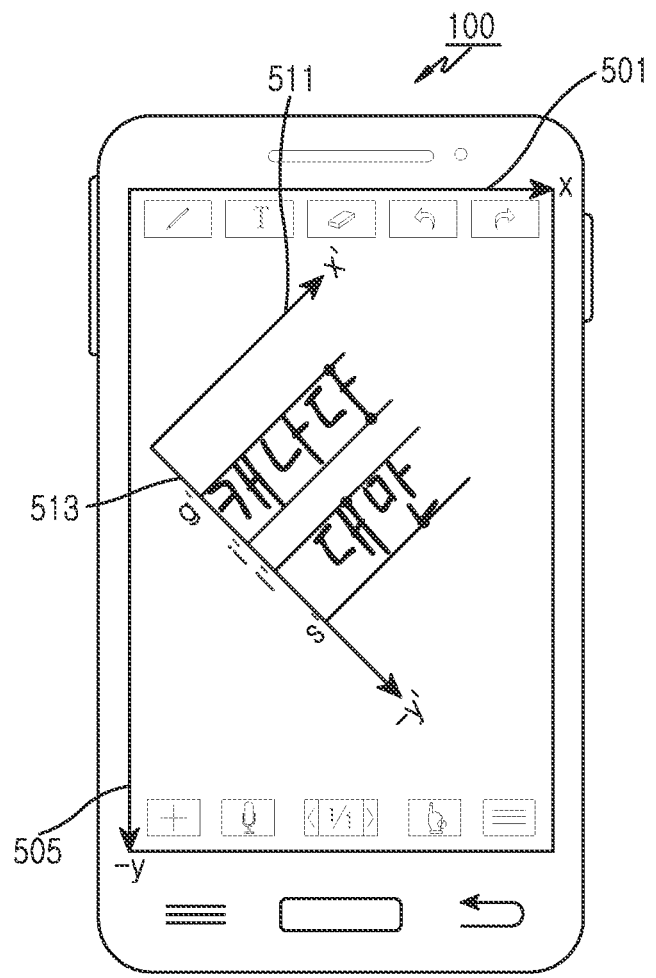
Figure 5C:
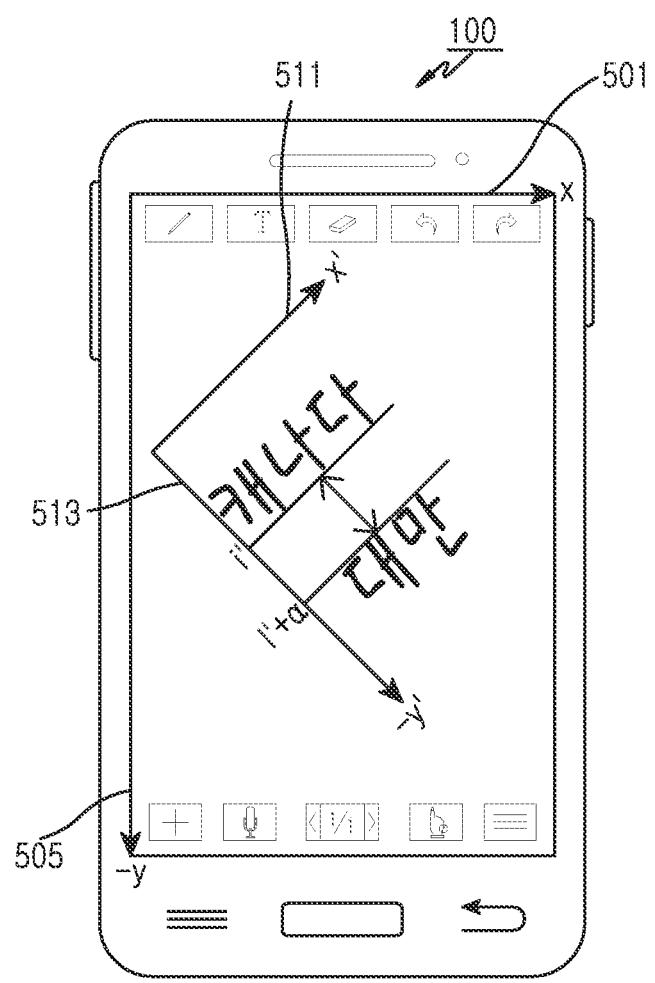

FIGS. 5A, 5B, and FIG. 5C illustrate an operation of reconfiguring a line interval in an electronic device according to an embodiment of the present disclosure.

According to the an embodiment, the electronic device 100 may configure a virtual coordinate axis in the touch screen 133, and may acquire a touch and/or hovering input location based on the virtual coordinate axis. According to an embodiment, the electronic device 100 may determine a virtual x-axis 501 and a virtual y-axis 505, which are not displayed in the touch screen 133. Another x-axis 503, illustrated in FIG. 5A, is a virtual x-axis 503 added to clearly display a coordinate described in the various embodiments. It is described hereinafter that an x-axis has a positive (+) value and a y-axis has a negative (−) value in the coordinate.

Hereinafter, an embodiment of the present disclosure will be described with reference to FIG. 5A.

Referring to FIG. 5A, the electronic device 100 may acquire a coordinate corresponding to objects which are input on two or more lines. According to an embodiment, the electronic device 100 may distinguish the input object by a word and a spelling.

The electronic device 100 may determine a highest value and lowest value of the x-axis direction and a highest value and lowest value of the y-axis direction in each word or each letter or spelling constituting the word in the input object. According to an embodiment, in a case of the object '캐나다' illustrated in FIG. 5A, a highest value and lowest value of the x-axis of '캐' may be respectively determined to 'c' and 'a', and a highest value and lowest value of the y-axis may be respectively determined to 'j' and 'l'. Further, a highest value and lowest value of the x-axis of '나' may be respectively determined to 'e' and 'b', and a highest value and lowest value of the y-axis may be respectively determined to 'h' and 'k'. Further, a highest value and lowest value of the x-axis of '다' may be respectively determined to 'f' and 'd', and a highest value and lowest value of the y-axis may be respectively determined to 'g' and 'i'.

According to an embodiment, by referring to each letter, the electronic device 100 may determine that an input letter is input with an inclination greater than or equal to a pre-set inclination in the x-axis. According to an embodiment, the electronic device 100 may determine a height of the letter based on a highest point and lowest point of a height of '캐' of the input object '캐나다'. According to an embodiment, a height of the object may be determined to be an average of heights of the respective letters '캐', '나', and '다' of the object '캐나다' input on one line. According to an embodiment, if a highest point of a height of a next input letter is greater, by a specific value, than a highest point of a height of an immediately previous input letter, then the electronic device 100 may determine that the object is an object which is input in an inclined state. According to an embodiment, if a difference between a highest height point 'h' of the input letter '나' and a highest height point 'j' of the immediate previous input letter '캐' is greater than a number, such as (j-1)/3 of the height of the input letter '캐', then the electronic device 100 may determine that '캐나다' is an object which is input in an inclined state.

Likewise, in the displayed object '대만', the electronic device 100 may determine a highest value and lowest value of the x-axis of '대' to 'o' and 'm', respectively, may determine a highest value and lowest value of the y-axis thereof to 'r' and 't', respectively, may determine a highest value and lowest value of the x-axis of '만' to 'p' and 'n', respectively, and may determine a highest value and lowest value of the y-axis thereof to 'q' and 's', respectively. The electronic device 100 may determine that the input object '대만' as an inclined letter according to the aforementioned method. According to various methods, in addition to the aforementioned method, the electronic device 100 may determine whether the input object is an object having the same or similar inclination with respect to a specific coordinate of '캐나다' and '대만'. According to an embodiment, the electronic device 100 may determine whether respective words, which are input on different lines, are input with the same or similar inclination through a line connecting a specific coordinate in a rectangular grid of each letter determined by using a highest value and lowest value of the x-axis and a highest value and lowest value of the y-axis of each letter of the input objects '캐나다' and '대만'.

Hereinafter, an embodiment of the present disclosure will be described with reference to FIG. 5B.

According to an embodiment, the electronic device 100 may determine a specific coordinate in a rectangular grid which encompasses each letter determined by using a highest value and lowest value of the x-axis and a highest value and lowest value of the y-axis of each letter of the input objects '캐나다' and '대만' of FIG. 5B, and may determine one or more lines connecting a specific coordinate determined in each of words '캐나다' and '대만'.

According to an embodiment, the electronic device 100 may determine an inclination of the input object to a positive (+) value. The electronic device 100 may determine a coordinate point (c,l) consisting of a highest value of the x-axis and a lowest value of the y-axis in a rectangular grid which encompasses a first letter '캐' of '캐나다' and a coordinate point (f,l) consisting of a highest value of the x-axis and a lowest value of the y-axis in a rectangular grid encompassing a last letter '다'. The electronic device 100 may determine a baseline of the input object '캐나다' by connecting the determined two coordinate points (c,l) and (f,i).

According to an embodiment, the electronic device 100 may determine an inclination of the input object to a positive (+) value. The electronic device 100 may determine a coordinate point (n,t) consisting of a highest value of the x-axis and a lowest value of the y-axis in a rectangular grid which encompasses a first letter '대' of '대만' and a coordinate point (p,s) consisting of a highest value of the x-axis and a lowest value of the y-axis in a rectangular grid encompassing a last letter '만'. The electronic device 100 may determine a baseline of the input object '대만' by connecting the determined two coordinate points (n,t) and (p,s).

As described above, the electronic device 100 may determine a coordinate point at a specific location of an input object according to whether an inclination of the input object is a positive (+) number or a negative (−) number, and may determine a baseline of the input object based on the determined coordinate point. According to the aforementioned description, the electronic device 100 may determine a coordinate point to be located at a lower portion of the input object when the baseline is determined by connecting the determined coordinate point. Without being limited to the determining of the coordinate point to be located at the lower portion of the letter, the electronic device 100 may determine a coordinate point of a specific location by referring to a rectangular grid which encompasses the letter such that a baseline is located at a lower portion of the letter and also at various portions.

The electronic device 100 may determine one reference line by using a baseline determined based on an object which is input on each line. According to an embodiment, the electronic device 100 may determine one reference line by averaging baselines of objects, which are input on respective lines. The electronic device 100 may determine one reference line as a new x'-axis 511 for input objects of two or more lines in an inclined state. The electronic device 100 may determine a y'-axis 513 orthogonal to the newly determined x-prime axis 511'.

The electronic device 100 may determine a line interval of the input objects '캐나다' and '대만' in a coordinate consisting of the determined x'-axis 511 and y'-axis 513. According to an embodiment, the electronic device 100 may determine a highest point, g-prime, and a lowest point, i-prime, of the input object '캐 나다'. According to an embodiment, the electronic device 100 may determine a highest point, l-prime, and a lowest point, s-prime, of the input object '대만'.

Hereinafter, an embodiment of the present disclosure will be described with reference to FIG. 5C.

According to an embodiment, the electronic device 100 may determine a line interval of input objects '캐나다' and '대만', and if the determined line interval does not satisfy a line interval which can be determined by the electronic device 100 as an object input on another line, may reconfigure the line interval.

According to the an embodiment of the present disclosure, the electronic device 100 may reconfigure a line interval of input objects if the line interval of the objects which are input on two or more lines does not satisfy a reference line interval, and may display the input objects to the touch screen 133 based on the reconfigured line interval.

According to an embodiment, the electronic device 100 may determine a line interval of the input objects '캐나다' and '대만'. The electronic device 100 may determine whether the determined line interval satisfies the reference line interval. According to an embodiment, if the line interval of '캐나다' and '대만' is less than ⅓ of an average height of '캐나다' and '대만', i.e., a reference line interval determined as shown in FIG. 5B, the electronic device 100 may determine that the reference line interval is not satisfied. The electronic device 100 may reconfigure the line interval of '캐나다' and '대만' to be greater than ⅓ of the average height of '캐나다' and '대만'. The electronic device 100 may determine an alpha value such that the line interval of '캐나다' and '대만' is the reconfigured line interval, and may move the input object '대만' by the alpha value in a −y'-axis direction. The electronic device 100 may display '캐나다' and '대만' to the screen 133 according to the reconfigured line interval.

When performing an operation of changing the input object to a digital object, the electronic device may reconfigure the line interval as described above if the line interval of the input object '캐나다' and '대만' is less than a reference line interval recognized by the electronic device 100 as an object input on another line, and may change a location of the input object according to the reconfigured line interval. Further, according to an embodiment, the electronic device 100 may use a reconfigured result as a reference when changing the object to the digital object. According to another embodiment, when performing the operation of changing the input object to the digital object, if the line interval of the input objects '캐나다' and '대만' is greater than the reference line interval recognized by the electronic device 100 as an object input on another line, the electronic device 100 may not reconfigure the line interval, but rather, may store information, such as a square grid, a baseline, etc., determined based on the input object. The electronic device 100 may perform an operation of acquiring the digital object by using the input object, and, if a time determined for data processing expires during the operation of acquiring the digital object is performed, or, if different digital data cannot be acquired by using a designated method or an error code is output, then the interval between the input objects may be reconfigured by using the information such as the square grid, the baseline, etc., determined based on the input object and stored in the electronic device 100.

Figure 6A:
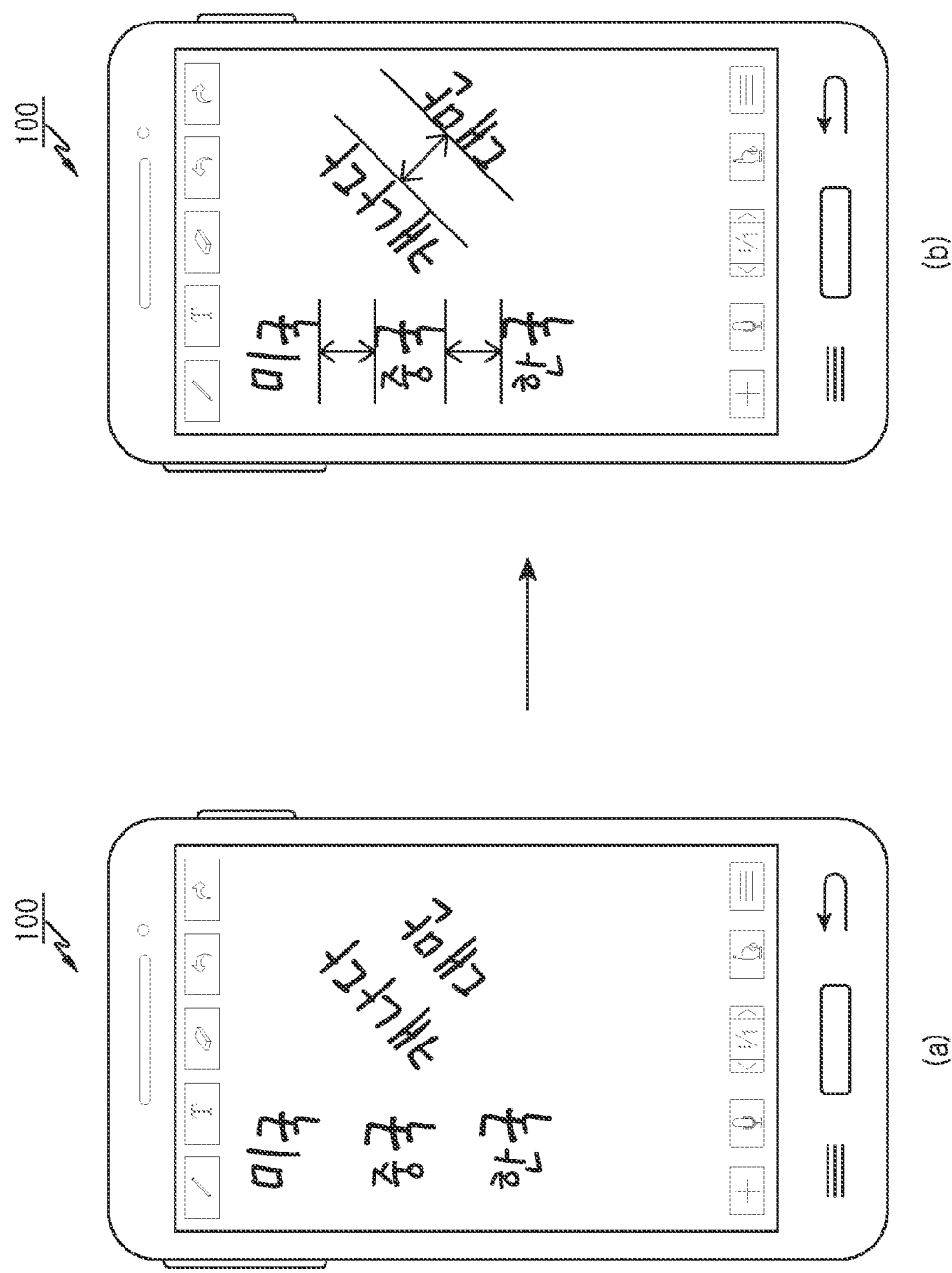
FIGS. 6A, 6B, and 6C illustrate an operation of processing an input object in an electronic device according to an embodiment of the present disclosure.
Figure 6B:
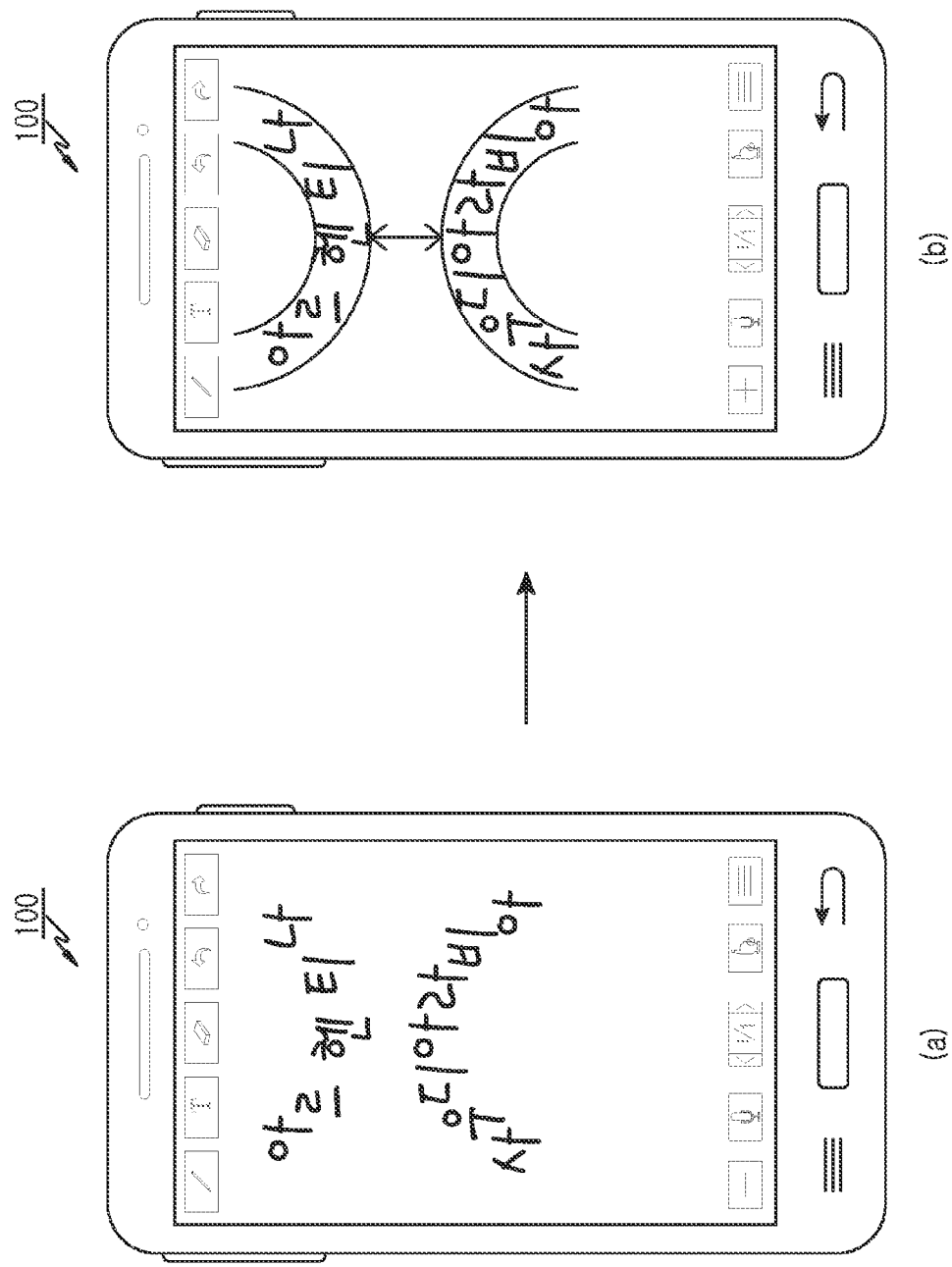
Figure 6C:
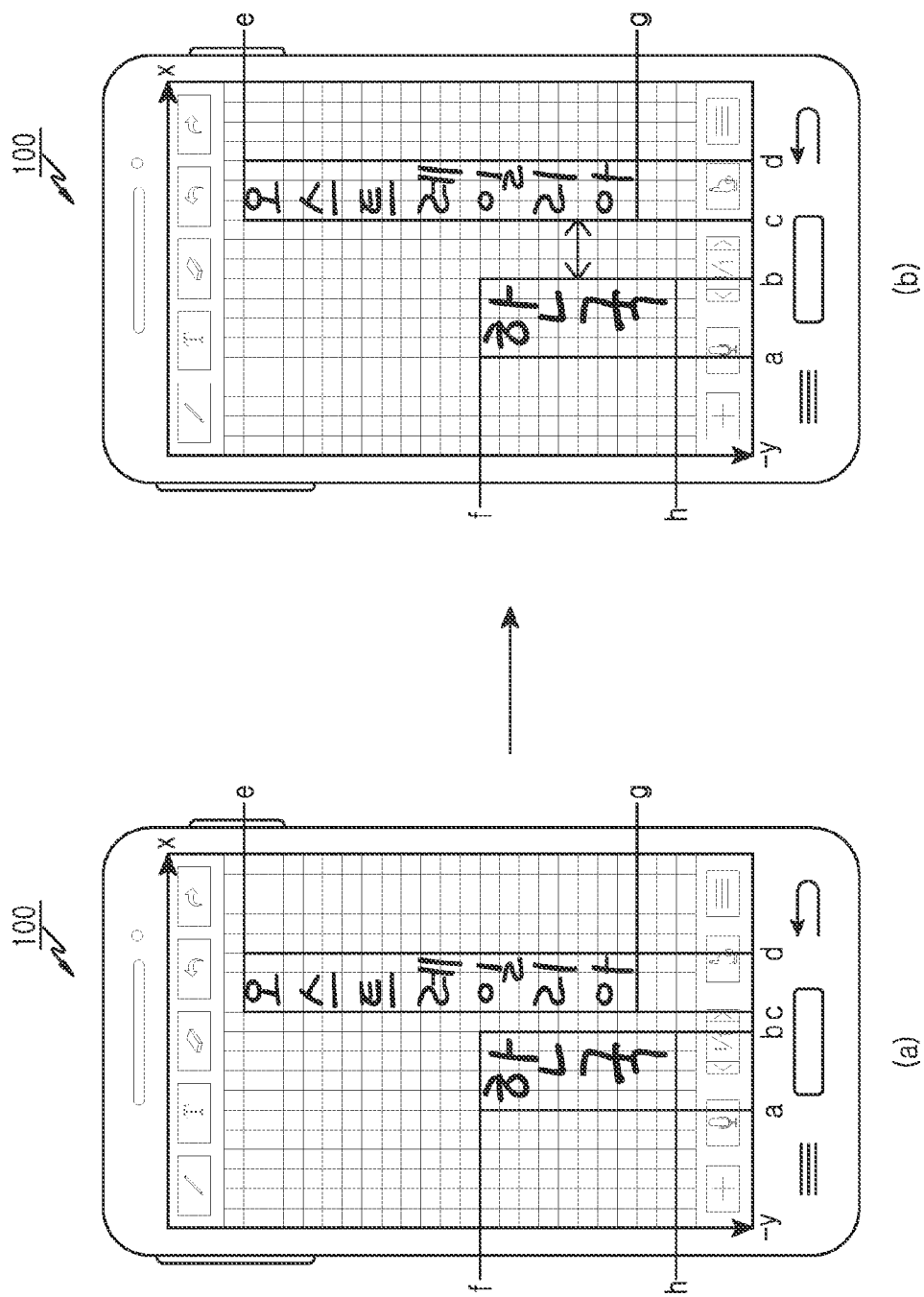

FIGS. 6A, 6B, and FIG. 6C illustrate an operation of processing an input object in an electronic device according to an embodiment of the present disclosure.

Hereinafter, an embodiment of the present disclosure will be described with reference to FIG. 6A.

When inputting an object to the touch screen 133, the electronic device 100 may input objects with different inclinations. For the input object, the electronic device 100 may determine objects having the same or similar inclinations, and may apply a different coordinate according to a group of the determined objects. The electronic device 100 may determine a line interval of the input objects by using each of the applied coordinates, and if the determined line interval does not satisfy a reference line interval by which the input object is determined as an object input on another line, may reconfigure the line interval of the objects.

Referring to FIG. 6A, as shown in screen (a), when inputting an object to the touch screen 133, the electronic device 100 may detect that objects, each having a different inclination, are input. The electronic device 100 may configure a new coordinate based on an inclination of an object to determine a line interval of the detected objects having different inclinations. The electronic device 100 may determine the object detected to configure the new coordinate as an object group having the same or similar inclination. According to an embodiment, the electronic device 100 may determine '미국', '중국', and '한국' as a first object group having the same or similar inclination, and may determine '캐나다' and '대만' as a second object group having the same or similar inclination. The electronic device 100 may determine whether the determined object group is an object group having an inclination that may be used for determining a line interval by using the coordinate configured in the touch screen 133. According to an embodiment, the electronic device 100 may determine an inclined state of the object by using a rectangular grid of a spelling constituting '미국', '중국', or '한국' of the first object group. The electronic device 100 may not configure the new coordinate if the coordinate configured in the touch screen 133 can be used. According to an embodiment, the electronic device 100 may determine an inclined state of the object by using a rectangular grid of a spelling constituting '캐나다' or '대만' of the second object group. The electronic device 100 may configure a new coordinate applicable to the second object group if the coordinate configured in the touch screen 133 cannot be used.

Referring to FIG. 6A, as shown in screen (b), if objects each having a different inclination are input to the touch screen 133, the electronic device 100 may configure a coordinate applicable to each object and may determine a line interval between the objects. According to an embodiment, the electronic device 100 may configure each of coordinates applicable to the first object group and the second object group, and the first object group or the second object group may determine a line interval between objects included in the groups independently. The electronic device 100 may determine the line interval of the objects included in each group, and if the determined line interval does not satisfy a reference line interval determined for another line, may independently reconfigure the line interval determined between the objects.

Hereinafter, an embodiment of the present disclosure will be described with reference to FIG. 6B.

Referring to FIG. 6B, as shown in screen (a), it may be determined, by using the object recognition program 115 or the object processing program 116, that an object input to the electronic device 100 or an object displayed to the touch screen 133 includes one or more spellings. According to an embodiment, the object including one or more spellings may be a character string, which is input on a curved line, as illustrated in FIG. 6B.

When determining a baseline of '아르헨티나', displayed to the touch screen 133, the electronic device 100 may not be able to determine one designated point of a square grid determined by using each letter as a linear line with respect to one axis of one or more coordinates determined to the touch screen 133. When the electronic device 100 cannot determine a baseline as a linear line, various patterns capable of inputting, and/or corresponding to, an object may apply to the displayed object '아르헨티나'. According to an embodiment, the electronic device 100 may apply a pattern of various figures to the displayed object '아르헨티나', and may determine that the object is an object displayed in a part of circle or a curve having an arc shape. When determining a baseline for an input object '사우디아라비아', if the electronic device 100 determines that the object is not an object which is input on a linear line, various patterns may be applied according to the aforementioned method, and a baseline based on a corresponding format may be determined.

According to another embodiment, if a matched pattern cannot be confirmed in an input method of a displayed object which is not input with a linear line, the electronic device 100 may determine a linear or curved baseline by using a designated coordinate of a square grid generated with at least one spelling or at least one letter.

Referring to FIG. 6B, as shown in screen (b), the electronic device 100 may determine two points on the same coordinate axis on which one point in at least one baseline determined based on '아르헨티나' is closest in distance to one point in at least one baseline determined based on the displayed object '사우디아라비아'. The electronic device 100 may determine whether a distance between the two determined points satisfies a reference line interval for recognizing an object which is input on another line. If it is determined that the line interval between the aforementioned two points is narrower and/or shorter than the reference line interval and thus does not satisfy the reference line interval, the electronic device 100 may reconfigure an interval between objects displayed based on the baseline for determining the line interval. If it is determined that the line interval between the two points is wider and/or longer than the reference line interval, and thus satisfies the reference line interval, instead of reconfiguring a baseline for determining the line interval or reconfiguring an interval between objects, the electronic device 100 may directly display objects displayed based on each baseline.

In addition, the electronic device 100 may store a baseline configured to the displayed object, a square grid, and information on a location of one or more objects or an interval between objects reconfigured based on the baseline, and if the location of the displayed object or line interval is reconfigured, may display the object according to the reconfigured information. In addition, the electronic device 100 may detect the object based on information of the object displayed to the electronic device 100, and may determine a digital object corresponding to the detected information. In a method of determining the digital object, the electronic device 100 may detect an object which is input via the object recognition program 115 or the object processing program 116 or an object displayed to the electronic device 100, and thus may determine a corresponding digital object.

Hereinafter, an embodiment of the present disclosure will be described with reference to FIG. 6C.

Referring to FIG. 6C, the electronic device 100 may provide at least one virtual line which may be used for determining a coordinate of a stroke input to the touch input unit 132 based on one or more coordinates configured to the touch screen 133 or by which a baseline is determined in one or more input strokes. In addition, the electronic device 100 may represent one or more virtual lines provided to the touch screen in a form of a grid based on which a location or shape of an input object or a stroke included in the object is measured.

Referring to FIG. 6C, as shown in screen (a), by the use of a stroke of the input object, the electronic device 100 may determine one or more virtual lines including the stroke. The electronic device 100 may form a square grid by using the determined virtual line, and may determine a baseline by using the virtual line. According to an embodiment, the electronic device 100 may determine a stroke with respect to each letter or spelling from the input object '한국'. The electronic device 100 may determine an area in which the object '한국' which is input through the detected stroke is located based on a coordinate, and may determine a virtual line including an end point of an outer area from the stroke of the input object '한국'. The electronic device may determine a virtual line a, including a lowest point of an x-axis of the object '한국', which is input through the detected stroke, and may determine a virtual line b including a highest point. The electronic device may determine a virtual line h including a lowest point of a y-axis of the object '한국', which is input through the detected stroke, and may determine a virtual line f including a highest point. According to an embodiment, the electronic device 100 may determine a stroke with respect to each letter or spelling from an input object '오스트레일리아'. The electronic device 100 may determine a virtual line c, including a lowest point of an x-axis of the object '오스트레일리아', which is input through the detected stroke, and may determine a virtual line d including a highest point. The electronic device may determine a virtual line g, including a lowest point of a y-axis of the object '오스트레 일리아', which is input through the detected stroke, and may determine a virtual line e including a highest point. Each virtual line determined in the electronic device 100 may be determined from at least one virtual line provided based on a coordinate configured to the touch screen 133, or may be in parallel with one or more coordinate axes.

The electronic device 100 may determine two virtual lines located in a closest inter-axis distance, or a closest distance between axes, of one virtual line in the input object '한국' and one virtual line in the input object '오스트레일리아' or including two points located in a closest distance to the same axis of the virtual lines of the respective objects. According to an embodiment, the electronic device 100 may determine two virtual lines located in the closest distance determined by using the input objects '한국' and '오스트레일리아' to the virtual lines b and c, respectively. The electronic device 100 may determine the virtual lines b and c as a baseline for determining a line interval between the input objects.

Referring to FIG. 6B, as shown in screen (b), the electronic device 100 may determine two points on the same coordinate axis on which one point in at least one baseline determined based on '아르헨티나' is closest in distance to one point in at least one baseline determined based on the displayed object '사우디아라비아'. The electronic device 100 may determine whether a distance between the two determined points satisfies a reference line interval for recognizing an object which is input on another line. If it is determined that the line interval between the aforementioned two points is narrower and/or shorter than the reference line interval, and thus does not satisfy the reference line interval, the electronic device 100 may reconfigure an interval between objects displayed based on the baseline for determining the line interval. If it is determined that the line interval between the two points is wider and/or longer than the reference line interval, and thus satisfies the reference line interval, instead of reconfiguring a baseline for determining the line interval or reconfiguring an interval between objects, the electronic device 100 may directly display objects displayed based on each baseline.

In addition, the electronic device 100 may store a baseline configured to the displayed object, a virtual line determined as the baseline, a square grid determined as the virtual line, and information on a location of one or more objects or an interval between objects reconfigured based on the baseline, and if the location of the displayed object or line interval is reconfigured, may display the object according to the reconfigured information. In addition, the electronic device 100 may detect the object based on information of the object displayed to the electronic device 100, and may determine a digital object corresponding to the detected information. In a method of determining the digital object, the electronic device 100 may detect an object which is input via the object recognition program 115 or the object processing program 116 or an object displayed to the electronic device 100, and thus may determine a corresponding digital object.

In the aforementioned various embodiments, referring to FIG. 2C, FIG. 3C, FIG. 4C, FIG. 5C, FIG. 6A, FIG. 6B, and FIG. 6C, it is described that the electronic device 100 outputs one or more objects moved according to a reconfigured interval between objects or line interval to the touch screen 133 or the display unit 131. However, the aforementioned drawings are only for an example for describing an operation of the electronic device 100 according to various embodiments, and thus the electronic device 100 may not output information on a reconfigured line interval and/or a location of objects reconfigured in accordance with the reconfigured line interval to the touch screen 133 or the display unit 131. According to an embodiment, if a line interval between two or more objects is reconfigured, instead of outputting to the touch screen 133 or the display unit 131, the electronic device 100 may perform various operations based on an object, such as an operation of recognizing an object based on information on the reconfigured object, e.g., an object in a state of data not output to a display device, or an operation of converting to a digital object.

Figure 7:
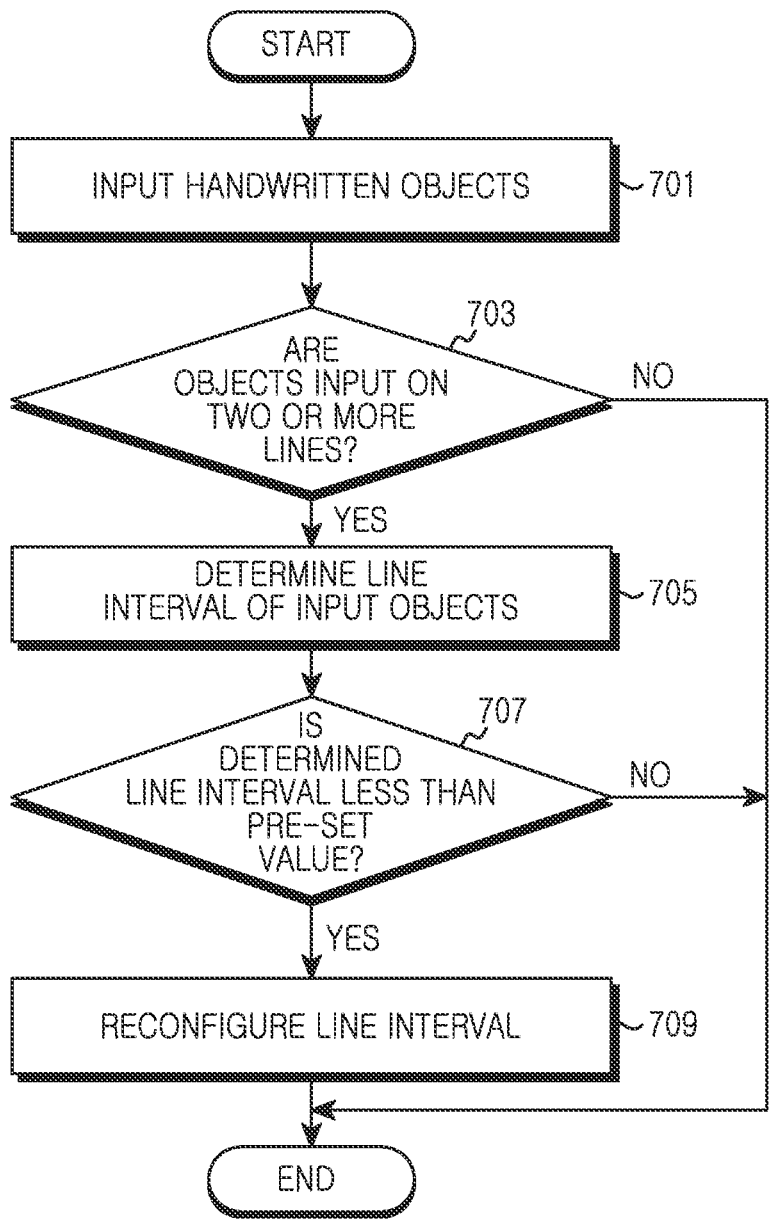
FIG. 7 is a flowchart illustrating an operation of processing an input object in an electronic device according to an embodiment of the present disclosure.

FIG. 7 is a flowchart illustrating an operation of processing an input object in an electronic device according to an embodiment of the present disclosure.

Referring to FIG. 7, according to an embodiment, the electronic device 100 may determine whether the input object is a text which is input on two or more lines, may determine a line interval of objects which are input on two or more lines, may determine whether the determined line interval of the objects satisfies a reference line interval, and if the line interval of the input objects does not satisfy the reference line interval, may reconfigure a line interval of the input objects.

In operation 701, the electronic device 100 may input at least one object, such as a handwritten object. The electronic device 100 may detect the handwritten object via the touch screen 133. According to an embodiment, the electronic device 100 may input an object, such as '미국', '중국', or '한국', to the touch screen as shown in FIG. 2. According to an embodiment, the electronic device 100 may input an inclined object, such as '캐나다' or '대만', an object having a designated pattern, such as '아르헨티나' or '사우디아라비아', or a vertically input object, such as '오스트레일리아', to the touch screen as shown in FIGS. 6A, 6B, and 6C. Without being limited to an object input to an input device such as the touch screen 133 in the detecting of the object, the electronic device 100 may detect an object by using object information included in data and an object displayed to the touch screen 133 or the display unit.

In operation 703, the electronic device 100 may determine whether the input objects are objects which are input on two or more lines. According to an embodiment, the electronic device 100 may confirm a stroke of the input object. According to an embodiment, the electronic device 100 may confirm a spelling of the input object, and may determine a highest point and a lowest point, which can be determined by using the stroke based on a coordinate in which the object is input. According to an embodiment, the electronic device 100 may determine whether the objects are the objects input on the two or more lines by using a stroke order by which the objects are input to the touch screen 133. If the electronic device 100 determines that the objects are input on the two or more lines, then operation 705 may be performed, and otherwise, the procedure of FIG. 7 may end.

In operation 705, the electronic device 100 may determine a line interval of the input objects, for example, by determining a distance between the determined lowest point and highest point. According to an embodiment, the electronic device 100 may determine a highest height value and lowest height value of '미국' and '중국', or a highest height value and lowest height value of '중국' and '한국', with respect to a y-axis as shown in FIGS. 3A, 3B, and 3C. According to an embodiment, the electronic device 100 may determine a highest height value and maximum lowest value of '캐나다' and '대만' with respect to a y'-axis as shown in FIG. 5A and FIG. 5C.

According to an embodiment, the electronic device 100 may determine a line interval of objects to a highest height value or lowest height value of the objects. According to an embodiment, the electronic device 100 may determine a distance between y'-axes of a lowest height value, i-prime, of '캐나다' and a highest height value, i-prime, of '대만', determined with respect to a y'-axis in the inclined objects '캐나다' and '대만' as a line interval of the objects '캐나다' and '대만'. In operation 707, the electronic device 100 may determine whether the determined line interval satisfies a reference line interval for determining objects which are input on two or more lines in the electronic device 100 in order to determine whether the line interval is less than a pre-set value. If the electronic device 100 determines that the line interval does not satisfy the reference line interval, or in other words, if it is determined that the line interval is less than the pre-set value in operation 707, then operation 709 may be performed, and otherwise, the procedure of FIG. 7 may end.

In operation 709, the electronic device 100 may reconfigure a line interval of objects when a reference line interval is not satisfied. If the line interval of the input objects does not satisfy a line interval that can be recognized in the electronic device 100, the electronic device 100 may reconfigure the line interval of the input objects. According to an embodiment, when determining a line interval of '중국' and '한국', if the line interval does not satisfy a line interval that can be recognized in the electronic device 100, e.g., a line interval greater than or equal to ⅓ of a height of an input object, the electronic device 100 may reconfigure the line interval of '중국' and '한국'. The electronic device 100 may determine respective heights of '중국' and '한국'. The line interval of '미국' and '중국' may be narrower than ⅓ of a height, which is pre-set in the electronic device 100, by being selected from a height of each object or an average height determined by averaging the heights of '중국' and '한국'. The electronic device 100 may move '미국' and '중국' in a y-axis direction to satisfy being ⅓ of a line interval of a pre-set height or may move '한국' in a -y-axis' direction, and may simultaneously move '미국', '중국', and '국'.

According to an embodiment, when determining a line interval of '캐나' and '다', if the line interval does not satisfy a line interval that can be recognized in the electronic device 100, e.g., a line interval greater than or equal to ⅓ of a height of an input object, the electronic device 100 may reconfigure the line interval of '캐나' and '다'. The electronic device 100 may determine respective heights of '캐나다' and '대만' through new coordinates x-prime and y-prime for determining coordinates of '캐나다' and '대만', which are input in an inclined state. The line interval of '캐나다' and '다' may be narrower than ⅓ of a height, which is pre-set in the electronic device 100, by being selected from a height of each object or an average height determined by averaging heights of '캐나다' and '대만'. The electronic device 100 may move '캐나다' in a 'y-prime axis' direction to satisfy being ⅓ of a line interval of a pre-set height or may move '대만' in a '-y-prime axis' direction, and may simultaneously move '캐나다' and '대만'.

When the electronic device 100 performs operation 709, the procedure of FIG. 7 may end.

According to an embodiment, the electronic device 100 may store an object, of which a line interval is reconfigured, into the memory 110 of the electronic device 100 as new data, and may transmit it to another electronic device. According to an embodiment, the electronic device 100 may receive object data which is input with a line interval that cannot be recognized in a peer electronic device, may reconfigure a line interval of a received object according to a reference line interval that can be recognized in the peer electronic device, and may transmit the object data of which the line interval is reconfigured to the peer electronic device.

According to an embodiment, the electronic device 100 may input data for an object moved according to the reconfigured line interval to an object recognition system, such as the object recognition program 115 of the electronic device 100, and may also transmit the data to various devices, such as an object recognition system connected with the electronic device in a wired or wireless manner, an object recognition system of one or more different electronic devices connected through network communication with the electronic device 100, and an object recognition system of a server device capable of controlling data transmission/reception with respect to different electronic devices.

According to an embodiments, without being limited to a case of sensing objects which are input on two or more lines in a handwriting manner via the touch screen 133, the electronic device 100 may confirm and/or determine a line interval of objects for which an operation of inputting a stoke order of the objects cannot be confirmed, such as image data including objects written on two or more lines, memo data pre-stored in a handwriting input manner, etc., and if an interval between lines does not satisfy a reference interval that may be used for determining two or more lines in the electronic device 100, the confirmed line interval may be reconfigured.

Figure 8:
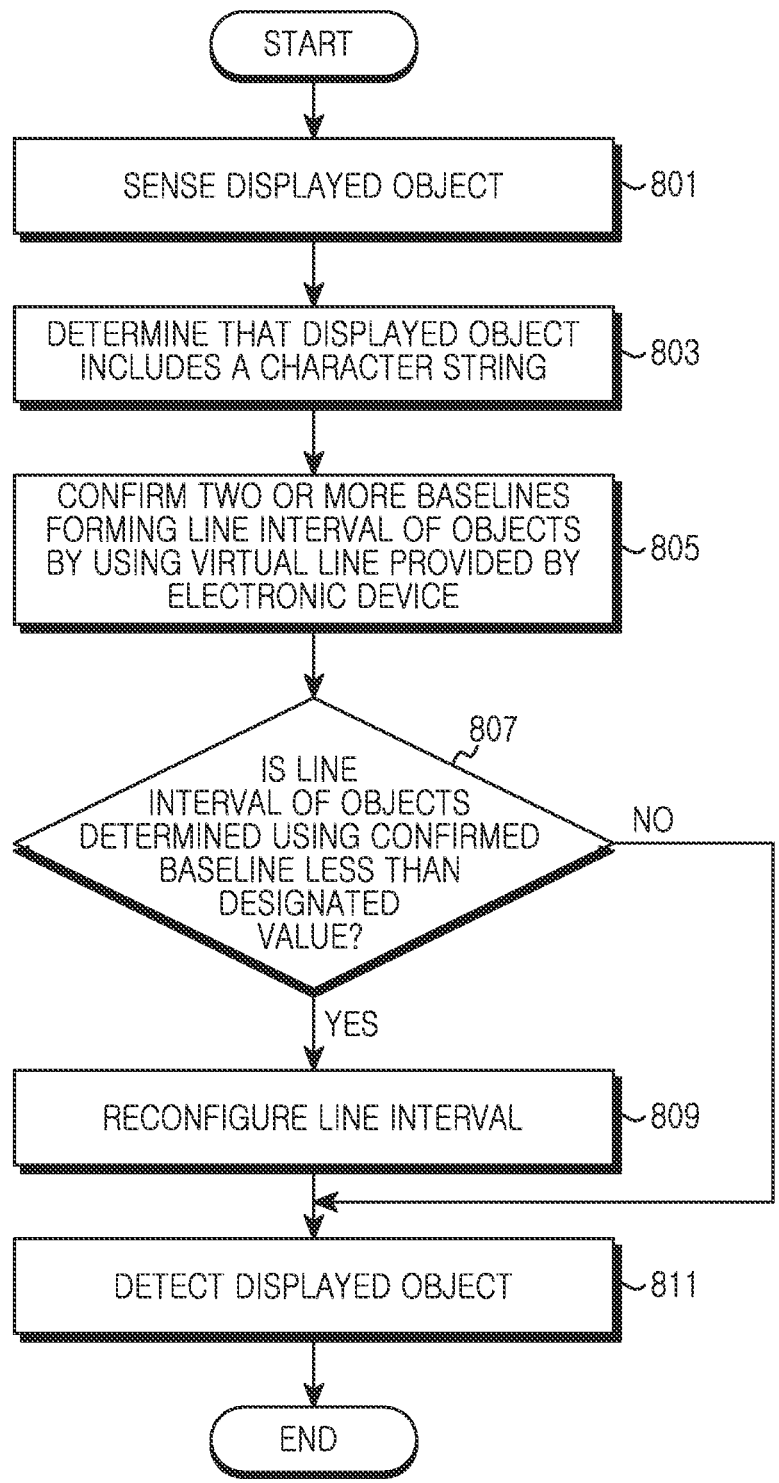
FIG. 8 is a flowchart illustrating an operation of processing a displayed object in an electronic device according to an embodiment of the present disclosure.

FIG. 8 is a flowchart illustrating an operation of processing a displayed object in an electronic device according to an embodiment of the present disclosure.

Referring to FIG. 8, the electronic device 100 may sense a display object, may determine whether the displayed object constitutes one or more spellings, may determine two or more baselines for determining a line interval of the displayed object, may compare the line interval of objects with a designated value by using the confirmed baseline, and if a line interval of the confirmed baseline is less than the designated value, may reconfigure the line interval of the display object, and may detect the displayed object.

In operation 801, the electronic device 100 may detect an object included in data, or in other words, may sense a displayed object included in data displayed on the electronic device 100. In the method of detecting the object included in the data, the electronic device 100 may use a method of detecting one or more stokes displayed to the touch screen 133.

In operation 803, the electronic device 100 may determine whether the object included in the data or the object displayed to the touch screen 133 includes a character string, such as one or more spellings, symbols, numbers, etc. According to an embodiment, the electronic device 100 may detect a character string, such as '대한 민국', included in image data, or a symbol such as "#", "?", a spelling or character string enumerated meaninglessly such as 'qwg', or a character string consisting of one or more of a symbol and a spelling.

In operation 805, the electronic device 100 may detect one or more objects, which are displayed in a specific area of a grid or virtual line provided based on a configured coordinate, and/or a stoke of the object, and may determine one or more baselines, for the detected objects and/or an object detected via an area of the stroke, forming a line interval of the detected objects by using the virtual line provided by the electronic device 100. According to an embodiment, the electronic device 100 may determine the baselines by referring to a grid or virtual line provided based on a coordinate configured to the touch screen 133.

In operation 807, the electronic device 100 may determine and/or confirm a baseline for determining a line interval by referring to a baseline determined for an object and a baseline of an adjacent object, and may determine a line interval between two or more baselines. The electronic device 100 may compare the line interval between the two or more baselines with a line interval designated in the electronic device 100, or in other words, may determine if the line interval of the objects determined using the confirmed baseline less than a designated valued. If the electronic device 100 determines that the line interval determined in the two or more baselines has a value less than the line interval designated in the electronic device 100, then operation 809 may be performed, and otherwise, operation 811 may be performed.

In operation 809, the electronic device 100 may reconfigure the line interval determined according to the two or more baselines. According to an embodiment, when reconfiguring the line interval, the electronic device 100 may reconfigure the line interval to have a value greater than or equal to a line interval designated in the electronic device 100 by referring to weights and measures, such as a metric system. According to another embodiment, when reconfiguring the line interval, the electronic device 100 may reconfigure the line interval to have a value greater than or equal to a line interval designated in the electronic device 100 by referring to a grid or virtual line provided based on a coordinate configured to the touch screen 133.

In operation 811, the electronic device 100 may detect a displayed object, or in other words, may recognize two or more objects contiguously displayed to the touch screen 133 as objects displayed to respective independent areas or two or more lines, and may acquire a character string, e.g., a spelling, a character, a symbol, a pattern, of a digital format corresponding to the objects. According to an embodiment, the electronic device 100 may acquire a digital object corresponding to each of objects contiguously displayed via the object recognition program 115 and/or the object processing program 116 from the object displayed to the touch screen 133.

When the electronic device 100 performs operation 811, the procedure of FIG. 8 may end.

According to the present disclosure, a method of operating an electronic device is provided. The method may include detecting an object displayed to a display unit, determining a line interval of the detected object, reconfiguring the determined line interval, and moving the object based on the reconfigured line interval.

In an embodiment of the present disclosure, a method of operating an electronic device is provided. The method may include detecting two or more objects displayed contiguously to a touch screen, determining a line interval of the contiguous objects, and reconfiguring an interval of the contiguous objects based on the determined line interval.

In addition, the input object may include one or more words which use at least one of a spelling, a letter, a word, a number, a pattern, a design, and a symbol.

In addition, in the reconfiguring, the line interval may be changed if the line interval of the contiguous objects is less than a pre-set line interval.

In addition, the reconfiguring may include reconfiguring a line interval between one of at least one baseline determined by a first object input on a first line and one of at least one baseline determined by a second object input on a second line. The at least one baseline determined by the first object may connect a specific point determined by a rectangular grid of a first letter or first spelling of the first object and a specific point determined by a rectangular grid of a second letter or second spelling. The rectangular grid may be determined by a lowest height point, a highest height point, a narrowest width point, and a widest width point with respect to each letter or spelling constituting the input object in one or more coordinates configured to the touch screen with respect to the displayed object. The one or more coordinates may determine one or more new first coordinate axes based on an inclination of the object located in a first coordinate determined to the touch screen, and determine a second coordinate consisting of the determined first coordinate axis and a second coordinate axis orthogonal to the first coordinate axis.

In addition, the contiguous objects may be objects which are input by using a touch input or hovering mechanism. The method may further include displaying to the touch screen the object of which the line interval is reconfigured. The method may further include storing or transmitting the object of which the line interval is reconfigured.

In an embodiment of the present disclosure, a method of operating an electronic device is provided. The method may include inputting a first object on a first line to a touch screen by using an input mechanism, inputting a second object on a second line to the touch screen by using the input mechanism, determining whether a line interval between the first object and the second object is less than a reference interval, and if the line interval is less than the reference interval, changing the line interval to be greater than or equal to the reference interval to reconfigure a location of one or more of the first object and the second object. The input mechanism may be a touch input mechanism and/or a hovering input mechanism.

In an embodiment of the present disclosure, an electronic device is provided. The electronic device may include a touch screen for outputting an input object, a memory for storing information on the input object, at least one processor may provide control to detect two or more objects displayed contiguously to the touch screen, to determine a line interval of the contiguous objects, and to reconfigure an interval of the contiguous objects based on the determined line interval.

In addition, the processor may provide control to detect a stroke of the object which is input by including one or more words which use at least one of a spelling, a letter, a word, a number, a pattern, a design, and a symbol.

In addition, the processor may provide control to reconfigure the line interval if the line interval is less than a line interval pre-set in the electronic device.

In addition, the processor may provide control to reconfigure a line interval between one of at least one baseline determined by a first object input on a first line and one of at least one baseline determined by a second object input on a second line. The processor may provide control to determine one or more baselines in the first object by connecting a specific point determined by a rectangular grid of a first letter or first spelling of the first object and a specific point determined by a rectangular grid of a second letter or second spelling. The processor may provide control to determine the rectangular grid by a lowest height point, a highest height point, a narrowest width point, and a widest width point, with respect to each letter or spelling constituting the input object in one or more coordinates configured to the touch screen, with respect to the display object. The processor may provide control to determine one or more new first coordinate axes based on an inclination of the object located in a first coordinate determined to the touch screen and to determine a second coordinate consisting of the determined first coordinate axis and a second coordinate axis orthogonal to the first coordinate axis.

In addition, the processor may provide control to determine a line interval for an object input to the touch screen by using a touch input or hovering mechanism.

In addition, the processor may provide control to display to the touch screen an object of which the line interval is reconfigured. The processor may provide control to store or transmit the object of which the line interval is reconfigured.

According to an embodiment of the present disclosure, an error occurrence can be controlled when an electronic device detects contiguous objects and converts the objects into digital objects. In addition, the error occurrence may be controlled by reconfiguring a line interval of the contiguous objects and converting the objects into the digital objects. In addition, readability of users can be improved by reconfiguring and displaying the line interval of the contiguous objects.

Various embodiments for describing the present disclosure may be performed by using one or more programs included in the memory 110 of the electronic device 100, or may be directly controlled by a processor. In addition, the various embodiments may also be controlled by using one or more control modules controlled by the processor, which may be a hardware element, and/or any other similar and/or suitable hardware element.

Methods based on the embodiments disclosed in the claims and/or specification of the present disclosure can be implemented in hardware, software, or a combination of both. When implemented in software, computer readable recording medium for storing one or more programs, i.e., software modules, can be provided. The one or more programs stored in the computer readable recording medium are configured for execution performed by one or more processors in the electronic device. The one or more programs include instructions for allowing the electronic device to execute the methods based on the embodiments disclosed in the claims and/or specification of the present disclosure.

The program, i.e., the software module or software, can be stored in a Random Access Memory (RAM), a non-volatile memory, including a flash memory, a Read Only Memory (ROM), an Electrically Erasable Programmable ROM (EEPROM), a magnetic disc storage device, a Compact Disc-ROM (CD-ROM), Digital Versatile Discs (DVDs), or other forms of optical storage devices, and a magnetic cassette. Alternatively, the program can be stored in a memory configured in combination of all or some of these storage media. In addition, the configured memory may be plural in number.

Further, the program can be stored in an attachable storage device capable of accessing the electronic device 100 through a communication network such as the Internet, an Intranet, a Local Area Network (LAN), a Wireless LAN (WLAN), or a Storage Area Network (SAN) or a communication network configured by combining the networks. The storage device can access via an external port to the electronic device 100.

In addition, an additional storage unit on a communication network can access the portable electronic device 100.

While the present disclosure has been shown and described with reference to exemplary various embodiments thereof, it will be understood by those skilled in the art that various changes in form and details may be made therein without departing from the spirit and scope of the present invention as defined by the appended claims and their equivalents.

What is claimed is:

1. A method in an electronic device, the method comprising:
   receiving a user input for inputting a plurality of objects, the plurality of objects including a first object and a second object;
   determining, based on a stroke order by which the plurality of objects is input, whether the plurality of objects is input on two or more lines, the two or more lines including a first line and a second line;
   identifying the first line including the first object and the second line including the second object;
   obtaining a line interval between the first line and the second line, and an inclined state of the plurality of objects;
   determining that the line interval is less than a predetermined line interval; and
   in response to determining that the line interval is less than the predetermined line interval, reconfiguring the line interval of the plurality of objects based on the detected line interval and the inclined state,
   wherein the reconfiguring of the line interval comprises enlarging the line interval between the first line and the second line,
   wherein the predetermined line interval corresponds to a minimum line interval required for distinguishing the first line from the second line,
   wherein the first line is determined based on the first object which is input on the first line,
   wherein the second line is determined based on the second object which is input on the second line, and
   wherein at least one of the first line or the second line has an arc shape.

2. The method of claim 1,
   wherein each of the plurality of objects is all or some parts of an object included in data, and
   wherein the data being at least one of photographed image data, captured image data, stored program data, text-format data, or data which is input through an input device.

3. The method of claim 2, wherein each of the data is generated by the electronic device and is received from at least one other electronic device connected to the electronic device.

4. The method of claim 1, wherein the plurality of objects are a character string including one or more elements which use at least one of a spelling, a word, a symbol, a number, a design, or a pattern.

5. The method of claim 1, wherein a number corresponding to a line interval to be changed is determined on the basis of a height of each of the plurality of objects.

6. The method of claim 1, wherein the first line determined by the first object is obtained by connecting a specific point, determined by a rectangular grid of a first letter or first spelling of the first object, and another specific point, determined by a rectangular grid of a second letter or second spelling.

7. The method of claim 6, wherein the rectangular grid is determined by a lowest height point, a highest height point, a narrowest width point, and a widest width point with respect to each letter or spelling constituting an input object in at least one coordinate configured to a screen of the electronic device with respect to the plurality of objects.

8. The method of claim 7, wherein the at least one coordinate is used to determine at least one new first coordinate axes based on an inclination of the input object located in a first coordinate corresponding to the screen, and is used to determine a second coordinate consisting of the determined first coordinate axis and a second coordinate axis orthogonal to the first coordinate axis.

9. The method of claim 1, wherein each of the plurality of objects is an object which is input in a handwriting manner by using a touch input or hovering mechanism.

10. The method of claim 1, further comprising displaying, on a screen of the electronic device, the plurality of objects of which the line interval is reconfigured.

11. The method of claim 1, further comprising at least one of storing or transmitting the plurality of objects of which the line interval is reconfigured.

12. The method of claim 11, wherein the transmission of the plurality of objects comprises transmitting the plurality of objects to at least one of an object recognition system of the electronic device, an object recognition system of an auxiliary device of the electronic device, an object recognition system of at least one other electronic device connected to the electronic device, or an object recognition system of a server which relays data transmission/reception with respect to at least one different electronic device.

13. An electronic device comprising:
   a display that displays a plurality of objects;
   a memory that stores information on the plurality of objects in the electronic device; and
   at least one processor that:
      receives a user input for inputting the plurality of objects, the plurality of objects including a first object and a second object,
      determines, based on a stroke order by which the plurality of objects is input, whether the plurality of objects is input on two or more lines, the two or more lines including a first line and a second line,
      identifies the first line including the first object and the second line including the second object,
      obtains a line interval between the first line and the second line, and an inclined state of the plurality of objects;
      determines that the line interval is less than a predetermined line interval, and
      in response to determining that the line interval is less than the predetermined line interval, reconfigures the line interval of the plurality of objects based on the determined line interval and the inclined state,
      wherein the reconfiguring of the line interval comprises enlarging the line interval between the first line and the second line,
      herein the predetermined line interval corresponds to a minimum line interval required for distinguishing the first line from the second line,
      wherein the first line is determined based on the first object which is input on the first line,
      wherein the second line is determined based on the second object which is input on the second line, and
      wherein at least one of the first line or the second line has an arc shape.

14. The electronic device of claim 13, wherein the at least one processor detects a stroke of an object among the plurality of objects for at least one element which includes at least one of a spelling, a word, a symbol, a number, a design, or a pattern.

15. The electronic device of claim 13, wherein the at least one processor:
acquires a height of each object among the plurality of objects, changes the determined line interval based on the acquired height, and
reconfigures the plurality of objects based on the changed line interval.

16. The electronic device of claim 13, further comprising a transceiver that transmits the first object and the second object of which the line interval is changed.

17. The electronic device of claim 13, further comprising a transceiver that transmits the first object and the second object to at least one of an object recognition system of the electronic device, an object recognition system of an auxiliary device of the electronic device, an object recognition system of at least one other electronic device connected to the electronic device, or an object recognition system of a server which relays data transmission/reception with respect to at least one different electronic device.

18. A non-transitory computer readable recording medium storing thereon at least one of an application or a program, the at least one of the application or the program when executed by one or more processors perform operations of:
receiving a user input for inputting a plurality of objects, the plurality of objects including a first object and a second object;
determining, based on a stroke order by which the plurality of objects is input, whether the plurality of objects is input on two or more lines, the two or more lines including a first line and a second line;
identifying the first line including the first object and the second line including the second object,
obtaining a line interval between the first line and the second line, and an inclined state of the plurality of objects;
detecting that the line interval is less than a predetermined line interval, and
in response to detecting that the line interval is less than the predetermined line interval, reconfiguring the line interval of the plurality of objects based on the determined line interval and the inclined state,
wherein the reconfiguring of the line interval comprises enlarging the line interval between the first line and the second line,
wherein the predetermined line interval corresponds to a minimum line interval required for distinguishing the first line from the second line,
wherein the first line is determined based on the first object which is input on the first line,
wherein the second line is determined based on the second object which is input on the second line, and
wherein at least one of the first line or the second line has an arc shape.

19. The non-transitory computer readable recording medium of claim 18, wherein the at least one processor detects a stroke of at least one of the first object and the second object for at least one element which includes at least one of a spelling, a word, a symbol, a number, a design, or a pattern.

20. The non-transitory computer readable recording medium of claim 18, wherein the at least one processor
acquires respective heights of the first object and the second object,
changes the line interval based on the acquired respective heights, and
moves a position of the first object and the second object based on the line interval that is the designated interval.

* * * * *